US011893262B2

(12) United States Patent
Yeung

(10) Patent No.: US 11,893,262 B2
(45) Date of Patent: Feb. 6, 2024

(54) GENERATING AND MAINTAINING A BATCH ACTION CLIPBOARD FOR WEB-BASED PLATFORMS

(71) Applicant: Dropbox, Inc., San Francisco, CA (US)

(72) Inventor: Stanley Yeung, Walnut Creek, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/656,599

(22) Filed: Mar. 25, 2022

(65) Prior Publication Data
US 2023/0305730 A1 Sep. 28, 2023

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
CPC ......... G06F 3/065; G06F 3/0604; G06F 3/067
USPC ........................................................ 711/154
See application file for complete search history.

(56) References Cited

U.S. PATENT DOCUMENTS

| | | |
|---|---|---|
| 8,555,187 B2 | 10/2013 | Margolin |
| 9,098,713 B2 | 8/2015 | Lee |
| 10,131,444 B1 | 11/2018 | Toews et al. |
| 10,255,446 B2 * | 4/2019 | Brooks ................. G06F 21/606 |
| 10,627,993 B2 | 4/2020 | Worley et al. |
| 11,050,851 B2 | 6/2021 | Antipa |
| 11,144,195 B2 | 10/2021 | Tao et al. |
| 2005/0203917 A1 * | 9/2005 | Freeberg ................. H04L 67/06 |
| 2011/0196829 A1 * | 8/2011 | Vickrey ............... G06F 16/275 |
| | | 707/622 |
| 2018/0267945 A1 * | 9/2018 | Han ...................... G06F 40/166 |

* cited by examiner

*Primary Examiner* — Than Nguyen
(74) *Attorney, Agent, or Firm* — Keller Preece PLLC

(57) ABSTRACT

The present disclosure is directed toward systems, methods, and non-transitory computer readable media for generating and maintaining an intelligent, web-based digital content clipboard for viewing and performing batch actions on copied content items. In particular, based on a client device request to copy a content item from a web-based folder, the disclosed systems can generate and add an item reference for the copied content item to a batch action clipboard. The disclosed systems can perform batch actions on multiple digital content items together with a single web-based batch action. The disclosed systems can also intelligently provide a clipboard element for display that is selectable to view item references representing content items copied to the batch action clipboard, along with a set of available batch actions for performing on one or more of the copied content items.

20 Claims, 19 Drawing Sheets

GENERATING AND MAINTAINING A BATCH ACTION CLIPBOARD FOR WEB-BASED PLATFORMS

BACKGROUND

Advancements in computing devices and networking technology have led to a variety of innovations in providing digital content to, and sharing digital content among, user accounts. For example, online digital content systems can now provide access to digital content items across devices all over the world. Existing systems can also synchronize changes to shared digital content across the devices. Indeed, whether in education, employment, or other areas, modern online digital content systems can provide access to digital content for users to collaborate across diverse physical locations and over a variety of computing devices. Despite these advances, however, existing digital content systems continue to suffer from a number of disadvantages, particularly in terms of computational efficiency, and flexibility.

As just suggested, many existing digital content systems inefficiently utilize computing resources, such as processing power and memory. Particularly, existing systems often treat stored content items on an individual level, sometimes requiring a client device or a server to process many user interactions to perform actions on the content items one at a time. In circumstances requiring movement of multiple content items within web-based environments, for instance, existing systems require processing many user interactions to move each of the content items one at a time to a new web-based network location. Some of these efficiency limitations are especially apparent in existing systems that manage digital content using web-based folders and web browser interfaces, where many of the data management functions native to a particular device, application, or operating system are not available.

In addition, existing systems often generate and provide inefficient graphical user interfaces that require an excessive number of user interactions to access certain data and functionality. Indeed, especially in the arena of web-based content management, existing systems provide cumbersome user interfaces that hamper, or reduce the efficiency of, copying digital content from one web-based location to another. Having to repeat the process of navigating through the various interfaces for moving each content item (e.g., by locating the web-based folder for each content item, copying it, and moving it to a designated location) compounds the number of user interactions required by these existing systems. Additionally, processing these user interactions wastes computing resources that could otherwise be preserved with more efficient user interfaces.

Due at least in part to their inefficient user interfaces, existing digital content systems are also inflexible. To elaborate, some existing systems are rigidly fixed to moving individual content items one at a time and cannot adapt to accommodate faster content management functions. Adding to their inflexibility, existing systems are often restricted to moving content items between locations via a single device and within a single application session. Indeed, particularly concerning web-based content management, existing systems usually require a single device in a single session to move a single content item directly from one location to another. Such rigidity can result in further drawbacks in existing systems, such as the inherent inefficiency of requiring frequently moved content items to be re-accessed for each new session and/or at each different device.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems generate and maintain an intelligent, web-based digital content clipboard for viewing and performing batch actions on copied content items. In particular, based on a client device request to copy a content item from a web-based folder (e.g., a folder within a web browser interface of a content management platform) the disclosed systems can generate and add an item reference for the copied content item to a batch action clipboard. The disclosed systems can perform batch actions on multiple digital content items together with a single web-based batch action, such as a batch copy-paste to copy multiple content items from their respective web-based folders to a designated web-based folder at once. The disclosed systems can also intelligently provide a clipboard element for display that is selectable to view item references representing content items copied to the batch action clipboard, along with a set of available batch actions for performing on one or more of the copied content items. Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
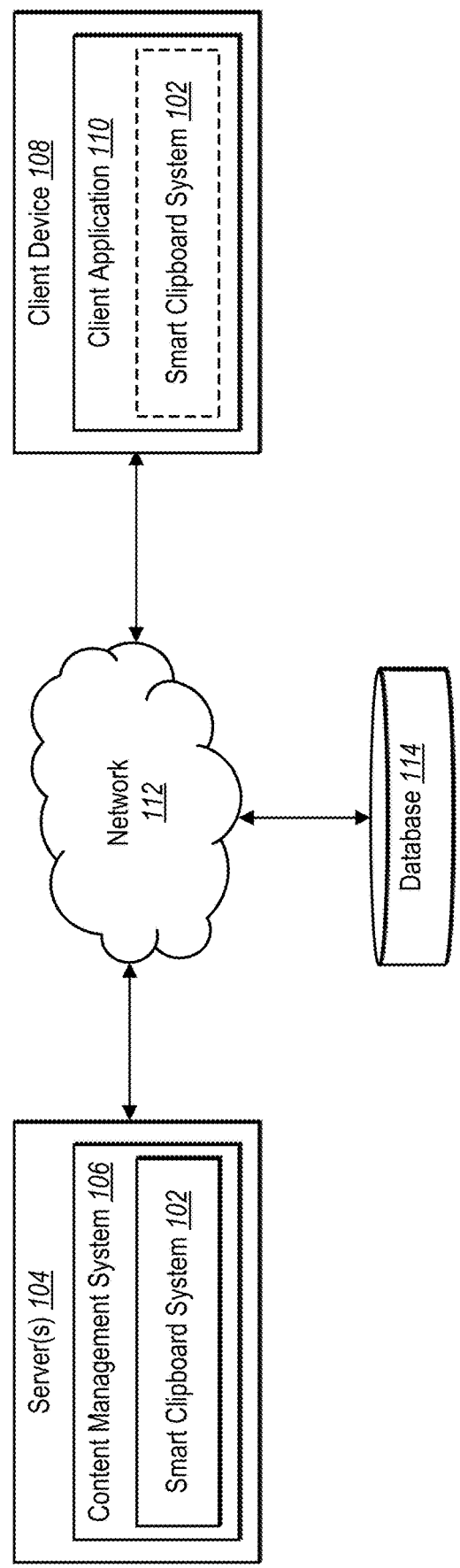
FIG. 1 illustrates a schematic diagram of an example environment of a smart clipboard system in accordance with one or more embodiments.

This disclosure describes one or more embodiments of a smart clipboard system that can intelligently manage item references for copied content items from within a web-based content management platform (e.g., via a web browser) using a batch action clipboard. For example, the smart clipboard system can add multiple item references for multiple copied content items to a batch action clipboard and can present the item references in a clipboard element that arranges the item references (e.g., in tabs according to content type) and that maintains a clipboard history of previously copied content items from the same application session and/or prior application sessions. The smart clipboard system can further perform batch actions on content items (e.g., on multiple content items together) corresponding to item references within the batch action clipboard by, for instance, copying and pasting a number copied content items from their respective web-based folders to an indicated destination folder.

As just mentioned, the smart clipboard system can generate and maintain a batch action clipboard for a web-based content management platform. More specifically, the smart clipboard system can generate a batch action clipboard for managing multiple content items copied from different web-based network folders via a web browser interface (and/or via a mobile application interface) of a web-based content management platform. For example, the smart clipboard system can identify a first content item to copy from a first web-based folder and can identify a second content item to copy from a second web-based folder (e.g., based on client device interactions within a web browser interface).

In response to identifying the content items, the smart clipboard system can generate a first item reference for the first content item and a second item reference for the second content item, where each item reference indicates the respective web-based folder location of the content item to which it corresponds (without storing the actual content data of the content item). The smart clipboard system can further add the first item reference and the second item reference to a batch action clipboard. In some cases, the smart clipboard system can maintain the item references in a clipboard history indicating when the respective content items were copied. The smart clipboard system can also maintain the item references (e.g., within the clipboard history) over multiple sessions within the web browser interface of the web-based content management platform and/or across different devices with access to a common user account (or as part of a collaborative team of user accounts) within a content management system (associated with the web-based content management platform).

In addition, the smart clipboard system can utilize a batch action clipboard for performing batch actions on multiple content items at once. As an example, the smart clipboard system can perform a batch copy-paste action to copy and paste multiple content items to a designated web-based folder together in a single action. For instance, the smart clipboard system accesses the respective web-based folders indicated by the item references within the batch action clipboard (which may be the same or different) and further copies the content items to a different web-based folder designated as a destination location for the batch action. Additional detail regarding various batch actions is provided below with reference to the figures.

As also mentioned above, in some embodiments, the smart clipboard system generates and provides a clipboard element representing a batch action clipboard for display on a client device. In particular, the smart clipboard system can provide a clipboard element that is moveable within a web browser interface (or a mobile application interface) and expandable to view item references and additional information. In some cases, the smart clipboard system can intelligently provide a clipboard element for display on a client device in response to receiving a client device interaction (e.g., information or data received from a client device indicating an interaction such as a user input) to copy a content item. In these or other cases, the smart clipboard system can use additional heuristic or predictive determinations to determine a clipboard appearance metric that indicates when to provide (and/or remove) a clipboard element for display.

As suggested above, the smart clipboard system can provide several improvements or advantages over existing digital content systems. For example, the smart clipboard system introduces novel smart clipboard capabilities not found in prior systems, especially not in prior systems that manage digital content in web-based folders in browser platforms. In particular, the smart clipboard system can provide a viewable space for accessing information on, and manipulating, copied items from various web-based locations. In addition, unlike prior web-based content systems that can manage content items only one at a time, the smart clipboard system can store multiple item references for multiple content items. In addition, the smart clipboard system can perform batch actions for manipulating multiple content items together. Additional features of the smart clipboard system not found in existing web-based content systems include a clipboard history for content items copied across multiple sessions and/or multiple devices, arrangement of item references within a batch action clipboard according to content type, filtering item references within a batch action clipboard, and collaborative access across multiple devices/user accounts to a collaborative batch action clipboard.

Due at least in part to its new functions, embodiments of the smart clipboard system more efficiently utilize computing resources such as processing power and memory compared to existing systems. Specifically, rather than requiring individual actions for each copied content item, the smart clipboard system can perform batch actions to copy and paste (or to perform other actions on) multiple content items with fewer interactions (e.g., a single client device interaction). Indeed, especially in web-based environments, prior systems often cannot provide a clipboard for managing multiple content items together, instead requiring many interactions to perform actions on content items at an individual level. Contrastingly, by providing a batch action clipboard, the smart clipboard system reduces the number of user interactions for web-based content management, thereby requiring fewer computing resources to process such interactions.

Contributing to its reduction in user interactions, the smart clipboard system can provide more efficient user interfaces than those provided by existing digital content systems. While some existing systems, especially existing web-based content systems, provide cumbersome user interfaces that require many user interactions for a computing device to copy and paste (or perform other actions on) multiple content items in different locations, the smart clipboard system can provide a clipboard element representing a batch action clipboard that includes item references for copied content items from different locations, different sessions, and/or different devices. As a result of providing the clipboard element, in some embodiments, the smart clipboard system requires only a single click (or at least fewer clicks) to move a plurality of content items from their respective web-based folder locations to a designated location, greatly reducing the number of user interactions compared to existing systems. Consequently, the smart clipboard system can prevent wasting computing resources in processing the user interactions required by existing systems.

Not only are embodiments of the smart clipboard system more efficient than existing digital content systems, but in some embodiments, the smart clipboard system is also more flexible. Compared to existing systems that can only move content items one at a time, the smart clipboard system can perform batch actions to move (or otherwise manipulate) multiple content items with a single action. Additionally, rather than limiting management of copied content to a single device within a single session, the smart clipboard system can more flexibly adapt a batch action clipboard for viewing and managing content items copied over multiple sessions and/or from multiple different devices (e.g., associated with the same user account or different user accounts in collaboration).

As illustrated by the foregoing discussion, the present disclosure utilizes a variety of terms to describe features and benefits of the smart clipboard system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a digital video file, a web file, a digital document file, or some other type of file or digital object. A digital content item can have a particular file type or file format, which may differ for different types of digital content items (e.g., digital documents or digital images). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

As mentioned, the smart clipboard system can generate and provide a batch action clipboard for managing content items. As used herein, the term "batch action clipboard" refers to a temporary storage location for storing, arranging, and manipulating item references of content items copied from one or more storage locations such as web-based folders. For example, a batch action clipboard can refer to an intermediate storage space for storing and viewing item references for managing content items stored at various locations across a content management system. In some cases, a batch action clipboard includes is visually represented by a "clipboard element" that refers to a user interface element visually representing a batch action clipboard. A clipboard element can be moveable to various locations within a user interface and can be expandable and can present various information such as a number of copied content items, content types associated with copied content items, tabs for arranging item references of copied content items (e.g., according to content type), filtering options for filtering item references of copied content items, and/or actions (e.g., batch actions) for performing on copied content items.

Relatedly, the term "web-based folder" can refer to a network location for storing content items, where the content items may or may not be located at the same physical location (e.g., server). For example, a web-based folder can include a network folder associated with, and/or viewable by, a web browser interface of a web-based content management platform or environment for managing stored content items via a web browser. In some cases, web-based folder is only accessible via a web browser, while in other cases a web-based folder also accessible via other applications such as a mobile application. For instance, a web-based folder can refer to a web browser version of a network storage location for content items that is viewable during a session within a web-based content management platform. In some embodiments, a web-based folder includes content items that reference or link other content items which are stored in one or more different locations (e.g., physical locations and/or network locations).

Along these lines a "web-based content management platform" can refer to a software platform that includes a web-based interface or a set of web-based interfaces for interacting with digital content of a content management system. For example, a web-based content management platform can include a web browser interface such as a webpage for managing content items within a content management system. Indeed, in certain embodiments, a web-based content management interface is only accessible via a web browser and refers to a web version of a content management interface, as opposed to a desktop application version or a mobile application version.

As used herein, the term "application session" (or sometimes simply "session") refers to an instance of use within a client application or within a particular collection or folder or content item using a client application. For example, an application session refers a set of activities performed within a single login of a client application. As another example, an application session refers to a set of activities performed within a single visit of a webpage or a single access of a content collection or folder. In some cases, a session requires a login while in other cases, a session does not require a login and instead indicates an instance of use between closures or terminations (of an application or webpage) or between visits that are at least a threshold period of time apart (or separated by a device power off or sleep mode).

Additionally, the term "item reference" can refer to a reference or pointer associated with a content item. For example, an item reference can include information associated with a content item, such as a name of the content item, a content type associated with the content item, a timestamp indicating when the content item was copied, and/or a location where the content item associated with the item reference is stored. In some embodiments, an item reference does not include the actual data of the content item itself, such as the text of a text file, or pixel data for a digital image or video.

As also mentioned, in some embodiments, the smart clipboard system can perform batch actions on content items corresponding to item references within a batch action clipboard. As used herein, the term "batch action" refers to a computing device action executable or performable on multiple content items. For example, a batch action can include an action executed on a plurality of content items together (e.g., simultaneously) and/or in response to a single client device interaction or a single action request. Example batch actions include pasting content items to a destination location, moving content items to a destination location, compressing (e.g., zipping) content items, moving content items to a vault, locking access to content items, adding content items to a specific workspace, sending content items with a transfer, and/or deleting content items.

Additional detail regarding the smart clipboard system will now be provided with reference to the figures. For example, FIG. 1 illustrates a schematic diagram of an example system environment for implementing a smart clipboard system 102 in accordance with one or more implementations. An overview of the smart clipboard system 102 is described in relation to FIG. 1. Thereafter, a more detailed description of the components and processes of the smart clipboard system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 11-12.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 and/or the database 114 via the network 112. For example, the client device 108 can receive user input from respective users interacting with the client device 108 (e.g., via the client application 110) to, for example, access, modify, share, or comment on digital content items and/or to interact with clipboard elements and item references. In addition, the smart clipboard system 102 on the server(s) 104 can receive information relating to various interactions with digital content items and/or user interface elements based on the input received by the client device 108 (e.g., to access, copy, edit, and/or share the digital content items).

As shown, the client device 108 can include a client application 110, respectively. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a content management interface (e.g., a web-based content management interface) that includes elements for digital content items, a batch action clipboard, item references, and/or batch actions for performing on content items. Additionally, the client device 108, through the client application 110, can present information in the form of digital content items and a clipboard element representing a batch action clipboard and can facilitate user interaction with the digital content items to access, copy, modify, share, and/or perform other batch actions on the digital content items.

As illustrated in FIG. 1, the example environment also includes the server(s) 104. The server(s) 104 may generate, track, store, process, receive, and transmit electronic data, such as digital content items, interactions with digital content items, interactions between user accounts or client devices, and/or batch action clipboard information. For example, the server(s) 104 may receive data from the client device 108 in the form of a request to copy one or more content items to a batch action clipboard or a request to perform a batch action on one or more content items. In addition, the server(s) 104 can transmit data to the client device 108 in the form of modifications to content items (as a result of batch actions) and modifications to user interfaces depicting various changes based on the batch actions. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the smart clipboard system 102 as part of a content management system 106. The content management system 106 can communicate with the client device 108 to perform various functions associated with the client application 110 such as managing user accounts, managing content items, managing a batch action clipboard, and facilitating user interaction with the digital content items and/or a batch action clipboard to modify, comment, and share digital content items. In some embodiments, the smart clipboard system 102 and/or the content management system utilize a database 114 to store and access information such as digital content items, batch action clipboard information, user accounts, and other information.

Although FIG. 1 depicts the smart clipboard system 102 located on the server(s) 104, in some implementations, the smart clipboard system 102 may be implemented by (e.g., located entirely or in part) on one or more other components of the environment. For example, the smart clipboard system 102 may be implemented by the client device 108, and/or a third-party device. For example, the client device 108 can download all or part of the smart clipboard system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the smart clipboard system 102, bypassing the network 112. As another example, the environment may include multiple client devices, each associated with a different user for managing digital content items. In addition, the environment can include the database 114 located external to the server(s) 104 (e.g., in communication via the network 112) or located on the server(s) 104 and/or on the client device 108.

Figure 2:
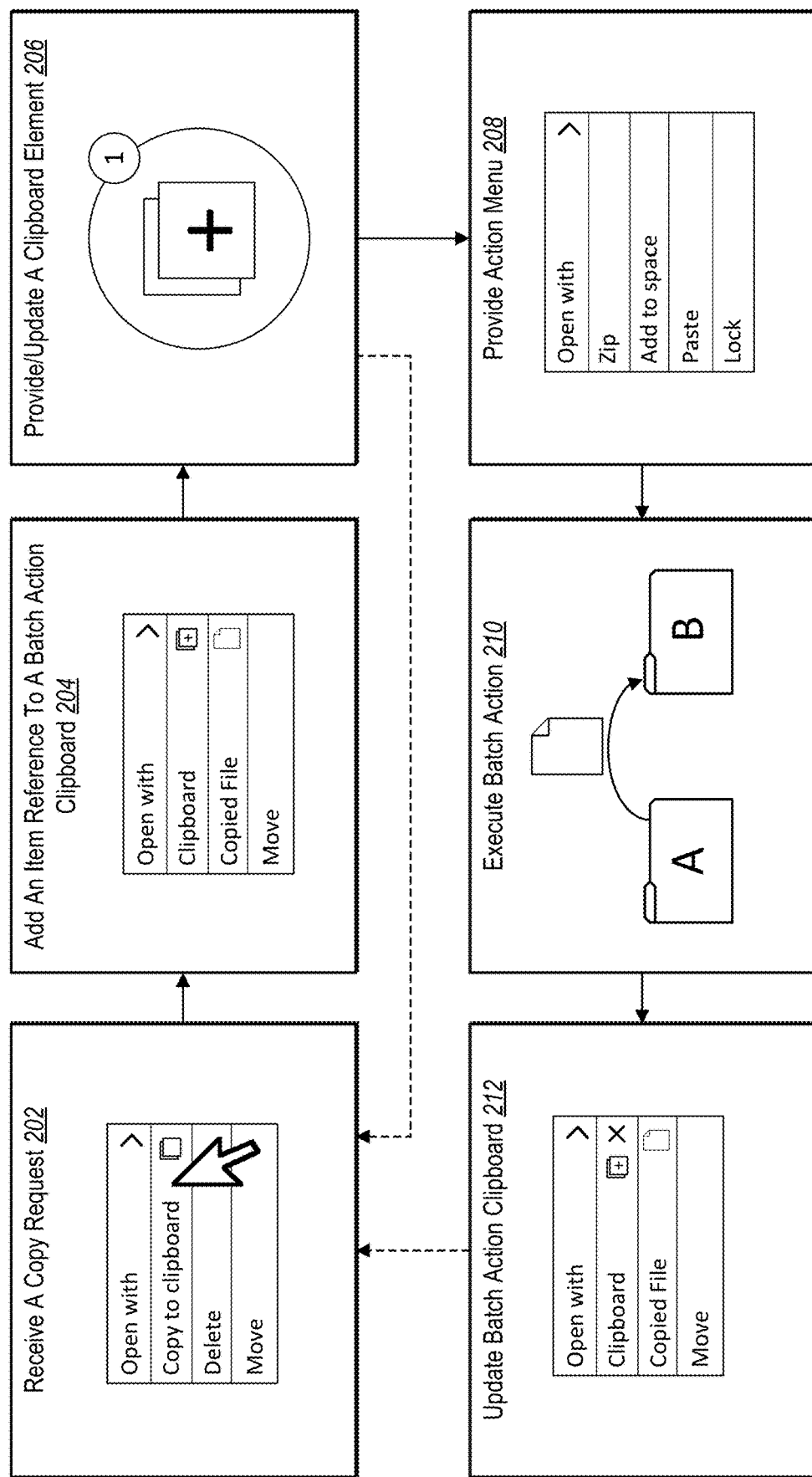
FIG. 2 illustrates an overview of generating and managing a batch action clipboard in accordance with one or more embodiments.

As mentioned above, the smart clipboard system 102 can generate and maintain a batch action clipboard for performing batch actions on content items within a web-based content management platform. In particular, the smart clipboard system 102 can add item references to, and otherwise update the item references and their corresponding content items utilizing, a batch action clipboard based on client device interactions. FIG. 2 illustrates an example overview of managing and updating a batch action clipboard (for use in a web-based environment) in accordance with one or more embodiments. Additional detail regarding the various acts of FIG. 2 is provided thereafter with reference to subsequent figures.

As illustrated in FIG. 2, the smart clipboard system 102 performs an act 202 to receive a copy request. More specifically, the smart clipboard system 102 can receive a client device interaction to copy one or more content items. For example, the smart clipboard system 102 receives data or information from a client device (e.g., the client device 108) indicating a request to copy a content item from a web-based folder maintained by the content management system 106. In some cases, the smart clipboard system 102 receives the copy request via a web browser interface associated with a web-based content management platform of the content management system 106.

Additionally, the smart clipboard system 102 performs an act 204 to add an item reference to a batch action clipboard. More particularly, the smart clipboard system 102 generates an item reference in response to the copy request of the client device interaction. For instance, the smart clipboard system 102 generates an item reference that indicates a web-based folder location of the content item requested to be copied, along with a name of the content item, a file type of the content item, and/or other information associated with the content item (but not including the actual data contents of the content item). In addition, the smart clipboard system 102 adds the item reference to a batch action clipboard. For example, the smart clipboard system 102 adds the item reference to a batch action clipboard for managing multiple item references and performing batch actions on multiple content items.

As further illustrated in FIG. 2, the smart clipboard system 102 performs an act 206 to provide or update a clipboard element based on the copy request and/or based on adding an item reference to a batch action clipboard. To elaborate, the smart clipboard system 102 determines to provide a clipboard element for a batch action clipboard in response to receiving a client device interaction indicating a copy request and/or in response to adding an item reference to a batch action clipboard. In some embodiments, the smart clipboard system 102 provides the clipboard element in the form of a user interface (UI) widget that is moveable and expandable within a web browser interface. As described in further detail below, the clipboard element indicates information associated with a batch action clipboard, including a number of item references copied to a batch action clipboard.

As shown, in some embodiments, the smart clipboard system 102 repeats the acts 202-206 to add multiple item references to a batch action clipboard and to update a clipboard element accordingly. For example, the smart clipboard system 102 receives a plurality of copy requests and adds corresponding item references to a batch action clipboard. The smart clipboard system 102 further updates a clipboard element to visually reflect the added item references. As described below in relation to subsequent figures, the smart clipboard system 102 can also maintain a history of item references added to a batch action clipboard and can organize or arrange the item references using various tools.

In addition, the smart clipboard system 102 performs an act 208 to provide an action menu. More specifically, the smart clipboard system 102 provides an action menu for display in relation to a clipboard element within a web browser interface. In some cases, the smart clipboard system 102 provides the action menu in response to a client device interaction to perform a batch action on one or more content items. As shown, the action menu includes a set of batch actions performable or executable on one or more content items corresponding to the item references within the batch action clipboard. Additional detail regarding the batch actions is provided below with reference to subsequent figures.

As further illustrated in FIG. 2, the smart clipboard system 102 performs an act 210 to execute a batch action. In particular, the smart clipboard system 102 executes or performs a batch action based on a client device indication selecting a particular batch action from an action menu. For instance, the smart clipboard system 102 performs a batch paste action to paste one or more copied content items corresponding to item references in the batch action clipboard. The smart clipboard system 102 can perform the batch action to a set of one or more content items corresponding to selected item references within the batch action clipboard and visually depicted within the clipboard element. Specifically, the smart clipboard system 102 can perform the batch action to the set of content items together (e.g., simultaneously or all at once) in response to a single action or a single client device interaction (e.g., a single selection of a batch action from the action menu). As shown, the smart clipboard system 102 performs a batch action to copy one or more content items from web-based folder A to web-based folder B.

Additionally, the smart clipboard system 102 performs an act 212 to update a batch action clipboard. To elaborate, the smart clipboard system 102 updates a batch action clipboard based on a batch action performed on one or more content items corresponding to item references within the batch action clipboard. In some embodiments, the smart clipboard system 102 updates a batch action clipboard by removing item references corresponding to content items that were acted on via the batch action. In some cases, the smart clipboard system 102 updates the batch action clipboard in other ways such as disabling or demoting item references corresponding to content items acted on via the batch action. Based on updating a batch action clipboard, the smart clipboard system 102 can further update a clipboard element to reflect the updates. For example, the smart clipboard system 102 can remove, disable, or demote item references within a clipboard element. Additional detail regarding updating a batch action clipboard is provided below with reference to subsequent figures.

In one or more embodiments, the smart clipboard system 102 repeats the acts 202-212 multiple times. For instance, the smart clipboard system 102 can receive multiple client device interactions to copy content items and perform batch actions on the content items. Accordingly, the smart clipboard system 102 can update a batch action clipboard and a corresponding clipboard element with respect to each copied content item and each batch action performed.

As mentioned, in certain described embodiments, the smart clipboard system 102 generates and manages a batch action clipboard. In particular, the smart clipboard system 102 can manage add item references to a batch action clipboard based on copy requests within a web browser interface. FIGS. 3A-3D illustrate example web browser interfaces for copying content items and adding item references to a batch action clipboard in accordance with one or more embodiments.

Figure 3A:
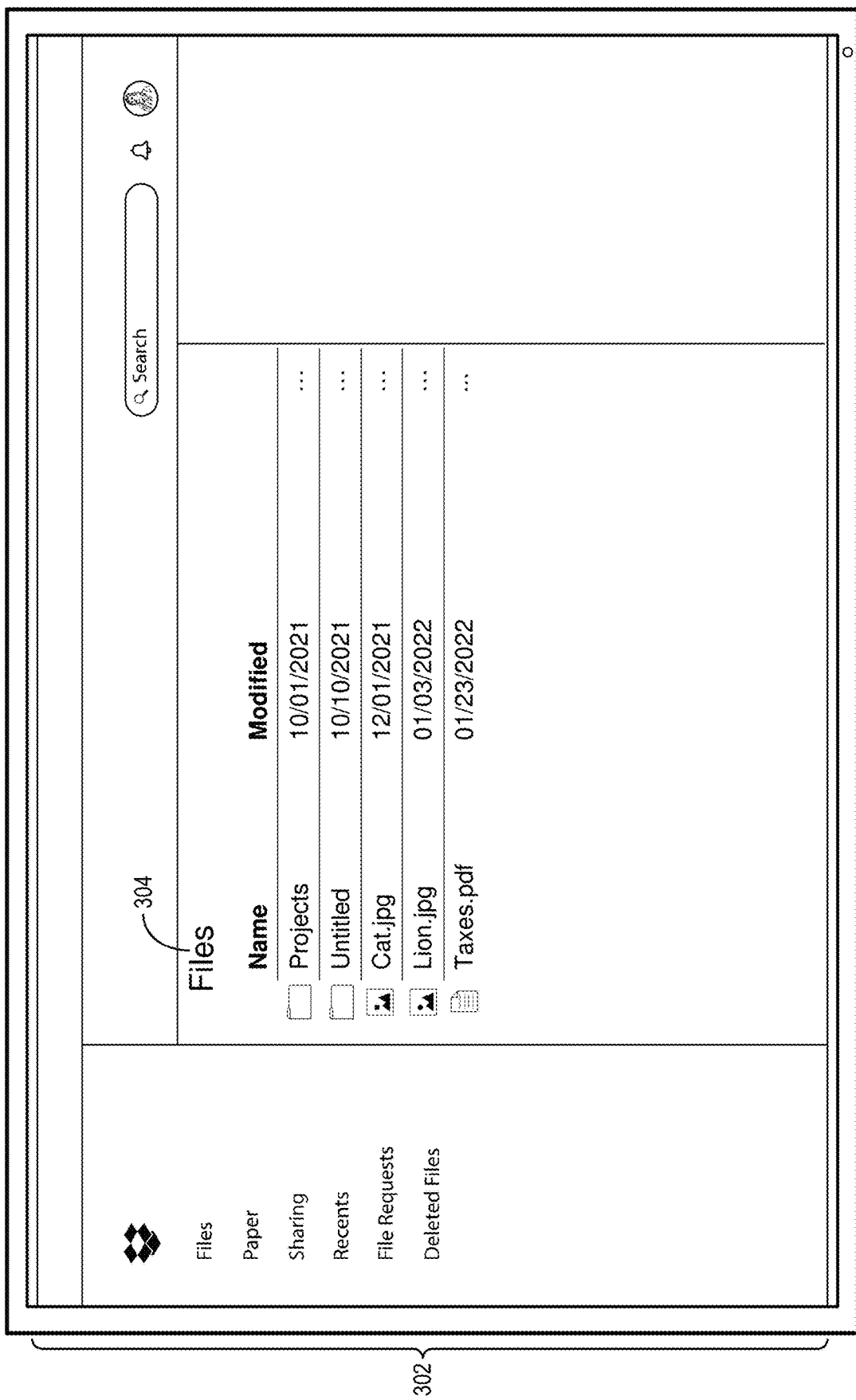
FIGS. 3A-3D illustrate example web browser interfaces for copying content items to a batch action clipboard in accordance with one or more embodiments.

As illustrated in FIG. 3A, the client device 108 displays a web browser interface 302 for managing content items associated with a user account within the content management system 106 (and stored within the database 114). The web browser interface 302 includes a header 304 indicating a web-based folder that includes one or more content items. In addition, the web browser interface 302 includes interface elements representing a number of content items stored within the depicted web-based folder and/or interface elements representing nested web-based folders within the web-based folder. As shown, the content items stored within the web-based folder have different content types, such as digital documents and digital images.

Figure 3B:
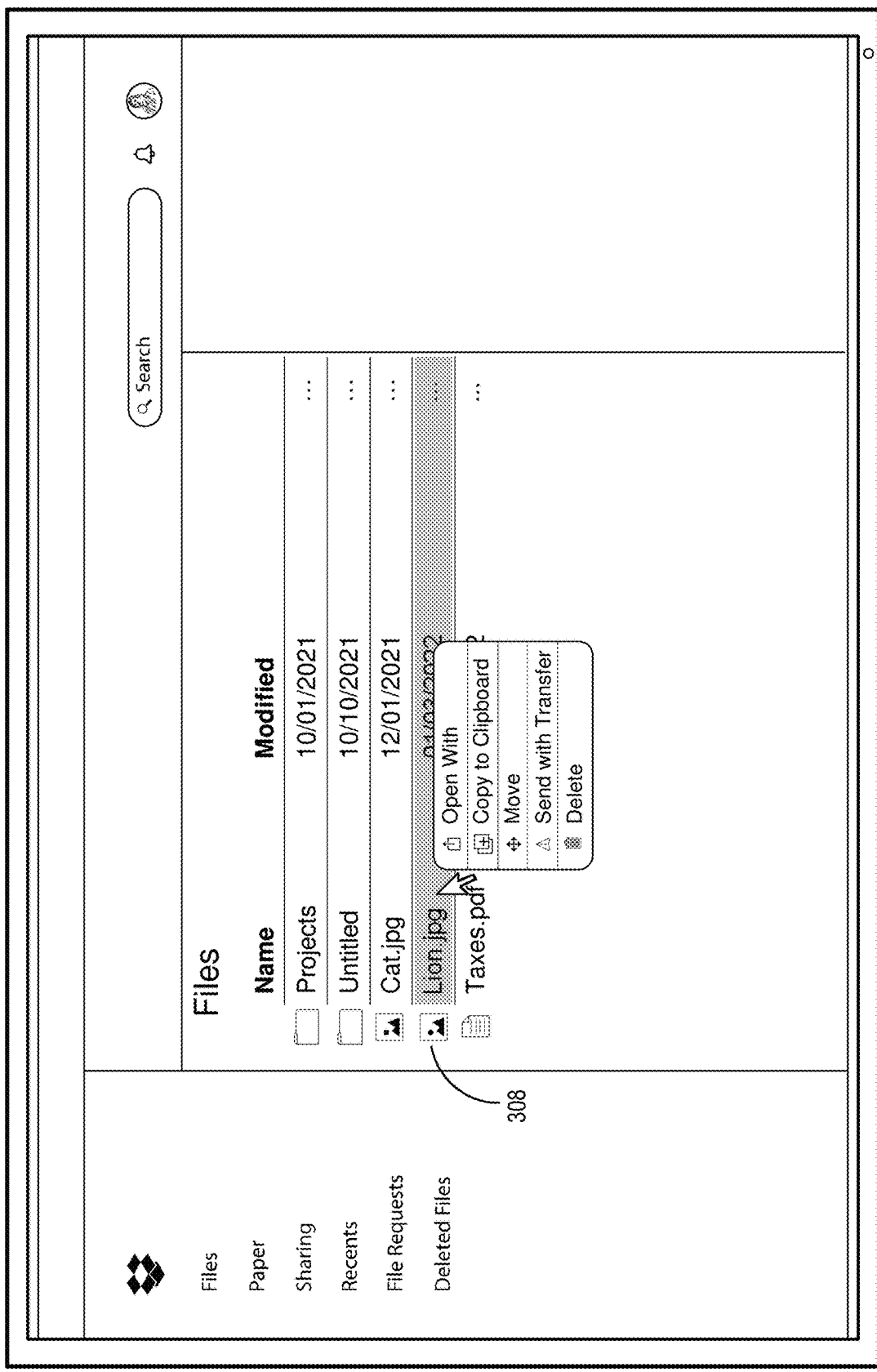

As illustrated in FIG. 3B, the smart clipboard system 102 receives a client device interaction from the client device 108 in the form of a copy request. Indeed, the client device 108 in FIG. 3B displays a web interface 306 with a highlighted content item 308. The smart clipboard system 102 further receives an indication of a copy request to copy the highlighted content item 308. For example, the smart clipboard system 102 receives a copy request via a keyboard input (e.g., a command-c or control-c input) or via a different input (e.g., by a mouse or touchscreen) such as a right-click or an input to open a menu for selecting a copy option or via an option menu element (e.g., the ellipsis corresponding to a content item within the web interface 306) to open a menu for selecting a copy option. In some embodiments, the smart clipboard system 102 identifies or receives a different type of triggering input such as a cut command input or a move command input (or some other type of content manipulation input) that instigates generating an item reference for a batch action clipboard.

Figure 3C:
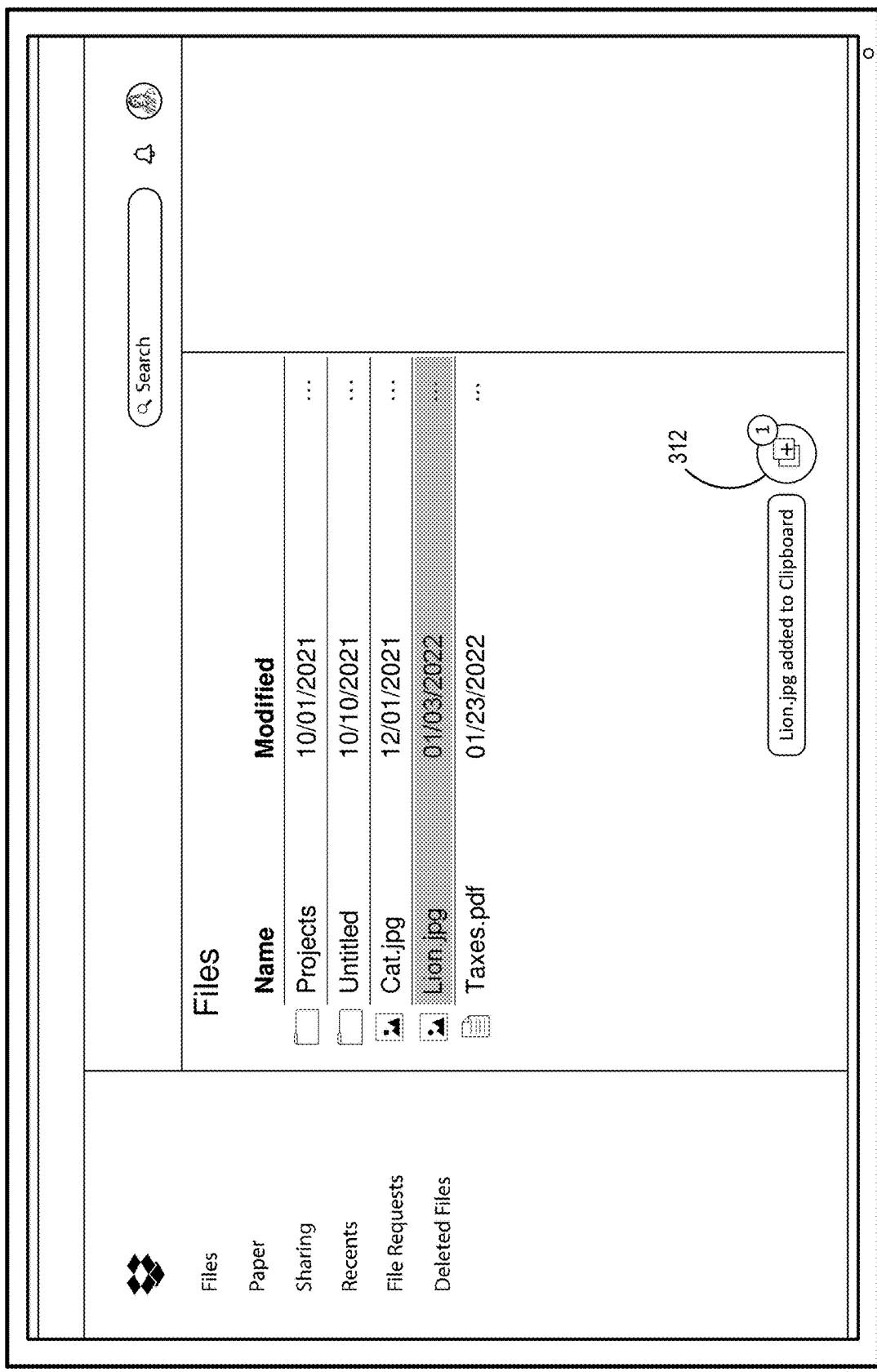

In response to the copy request (or some other triggering input), the smart clipboard system 102 generates an item reference for the content item 308 to add to a batch action clipboard. In addition (and in further response to the copy request), the smart clipboard system 102 provides a clipboard element visually representing the batch action clipboard for display within a web browser interface. Indeed, FIG. 3C illustrates a modified web browser interface 310 that includes a clipboard element 312. As mentioned, the smart clipboard system 102 generates and provides the clipboard element 312 for display on the client device 108 (e.g., within the modified web browser interface 310). In some cases, the smart clipboard system 102 provides the clipboard element 312 in response to a copy request and/or in response to adding an item reference to a batch action clipboard. In these or other cases, the smart clipboard system 102 provides the clipboard element 312 for display based on some other intelligent determination of a clipboard appearance metric, which intelligent features are discussed in further detail below in relation to later figures. For instance, the smart clipboard system 102 determines that one or more item references remain (e.g., from a previous session) within a batch action clipboard that have not yet been acted on, and the smart clipboard system 102 therefore provides the clipboard element 312 immediately upon detecting a new login for another application session.

In one or more embodiments, the clipboard element 312 is persistent within a web browser interface. More specifically, the smart clipboard system 102 can update and modify the web browser interface 310 based on various client device interactions to navigate among web-based folders, preview content items, add content items, remove content items, and otherwise perform actions within the web-based environment of the content management system 106, and can maintain the clipboard element 312 persistently in view all the while. In some cases, the clipboard element 312 hovers over other displayed content within the web browser interface 310, overlaying or floating above text or other content that is part of the web browser interface 310 beneath the clipboard element 312.

In certain embodiments, the clipboard element 312 is also moveable. For example, the smart clipboard system 102 can receive a client device interaction to relocate or move the clipboard element 312 (e.g., via a click and drag input). In response, the smart clipboard system 102 moves the clipboard element 312 to a new location indicated by the client device interaction without altering or modifying contents with the batch action clipboard. In some cases, the smart clipboard system 102 remembers an interface location where the clipboard element 312 is placed in a first application session and provides the clipboard element 312 or display in the same location upon detecting a login for a second application session.

Additionally, in some cases the clipboard element 312 is expandable. For instance, the smart clipboard system 102 can receive a client device interaction to expand the clipboard element 312 (e.g., via a selection such as a click or a tap) for viewing additional information corresponding to copied content items. Additional detail regarding expanding the clipboard element 312 and providing additional information and functionality within an expanded version is provided below with reference to subsequent figures.

Figure 3D:
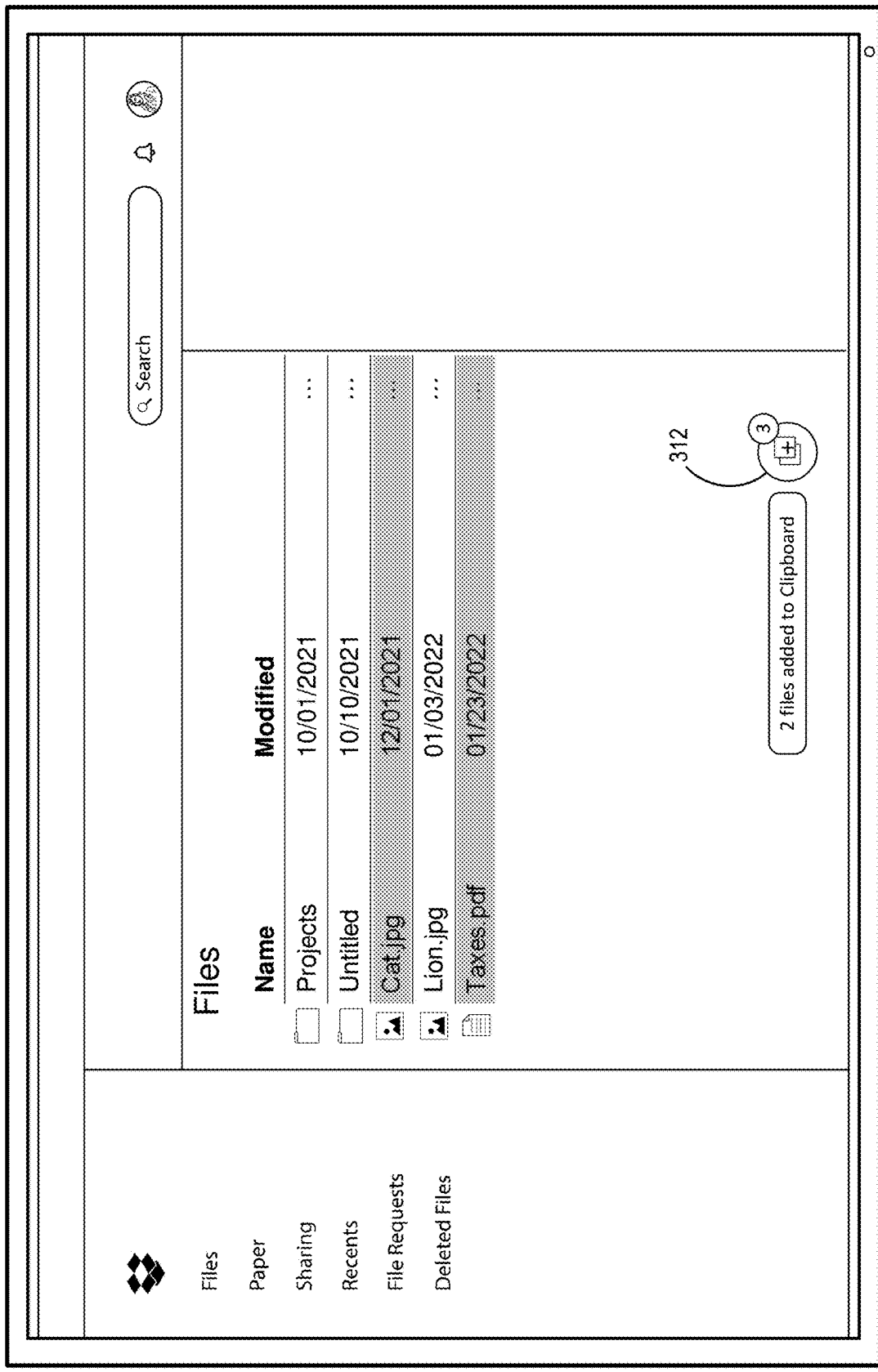

As mentioned, the smart clipboard system 102 can add multiple item references to a batch action clipboard. In particular, the smart clipboard system 102 can add item references one at a time or more than one at a time based on selections of content items within web-based folders and copy requests. FIG. 3D illustrates adding additional item references to a batch action clipboard in accordance with one or more embodiments. As shown, the smart clipboard system 102 receives a copy request to copy two additional content items from the same web-based folder (or a different web-based folder). In addition, the smart clipboard system 102 generates and adds two additional item references to the batch action clipboard for the new content items (e.g., the "Cat" image and the "Taxes" PDF file). The smart clipboard system 102 further updates or modifies the clipboard element 312 to reflect the number of item references within the batch action clipboard by, for example, changing from one to three in response to adding the two new item references.

As mentioned, the smart clipboard system 102 further maintains a clipboard history associated with item references added to a batch action clipboard. To elaborate, the smart clipboard system 102 determines timestamps when each content item is copied and/or when each item references is added to the batch action clipboard. The smart clipboard system 102 further orders or arranges item references within a batch action clipboard according to their respective timestamps. For example, the smart clipboard system 102 provides an expanded version of the clipboard element 312 (like that shown in FIG. 5) and orders the listing of item references in a chronological arrangement according to their timestamps. Indeed, the smart clipboard system 102 can receive a client device interaction to expand the clipboard element 312.

In some cases, the smart clipboard system 102 maintains the clipboard history across different devices and/or different application sessions. In certain embodiments, the smart clipboard system 102 determines that an item reference exceeds a threshold age within a batch action clipboard and moves the item reference into a particular tab or nested menu (e.g., an "older items" menu) within a batch action clipboard and/or a corresponding clipboard element. Indeed, the smart clipboard system 102 can indicate or mark older item references by placing them within an "older" menu that is selectable to view the item references therein. In some cases, the smart clipboard system 102 indicates item references for content items copied from any previous session with a previous session indicator visible within an expanded version of the clipboard element 312.

In some embodiments, the smart clipboard system 102 receives a client device interaction adding a folder to a batch action clipboard. For example, the smart clipboard system 102 receives a click and drag or some other input to copy a folder containing one or more content items. Based on the request to copy the folder, the smart clipboard system 102 identifies content items within the folder, the smart clipboard system 102 adds a folder reference for the folder to a batch action clipboard. In some cases, the smart clipboard system 102 generates item references for each of the content items within the folder to add to the batch action clipboard. In certain embodiments, the smart clipboard system 102 adds a folder reference and associates each of the content items within the folder to the folder reference, including their respective storage locations (e.g., web-based folders), names, file types, and other information.

In certain embodiments, the smart clipboard system 102 receives a client device interaction to copy digital body content. More specifically, the smart clipboard system 102 receives a client device interaction to add portions of (but not all of) digital content items, such as internal contents within a body of a digital content item, to a batch action clipboard. For example, the smart clipboard system 102 receives a client device interaction to copy a portion of text from within a text file and/or (a portion of) a digital image or some other selection of digital content. In some cases, the smart clipboard system 102 adds a body content reference corresponding to the copied body content to a batch action clipboard and presents the body content reference within a clipboard element. For instance, the smart clipboard system 102 provides a visual indicator to designate a body content reference within a clipboard element. In some embodiments, the smart clipboard system 102 provides a separate tab or some other organizational tool to differentiate references of copied body content from those of other copied content items.

Figure 4A:
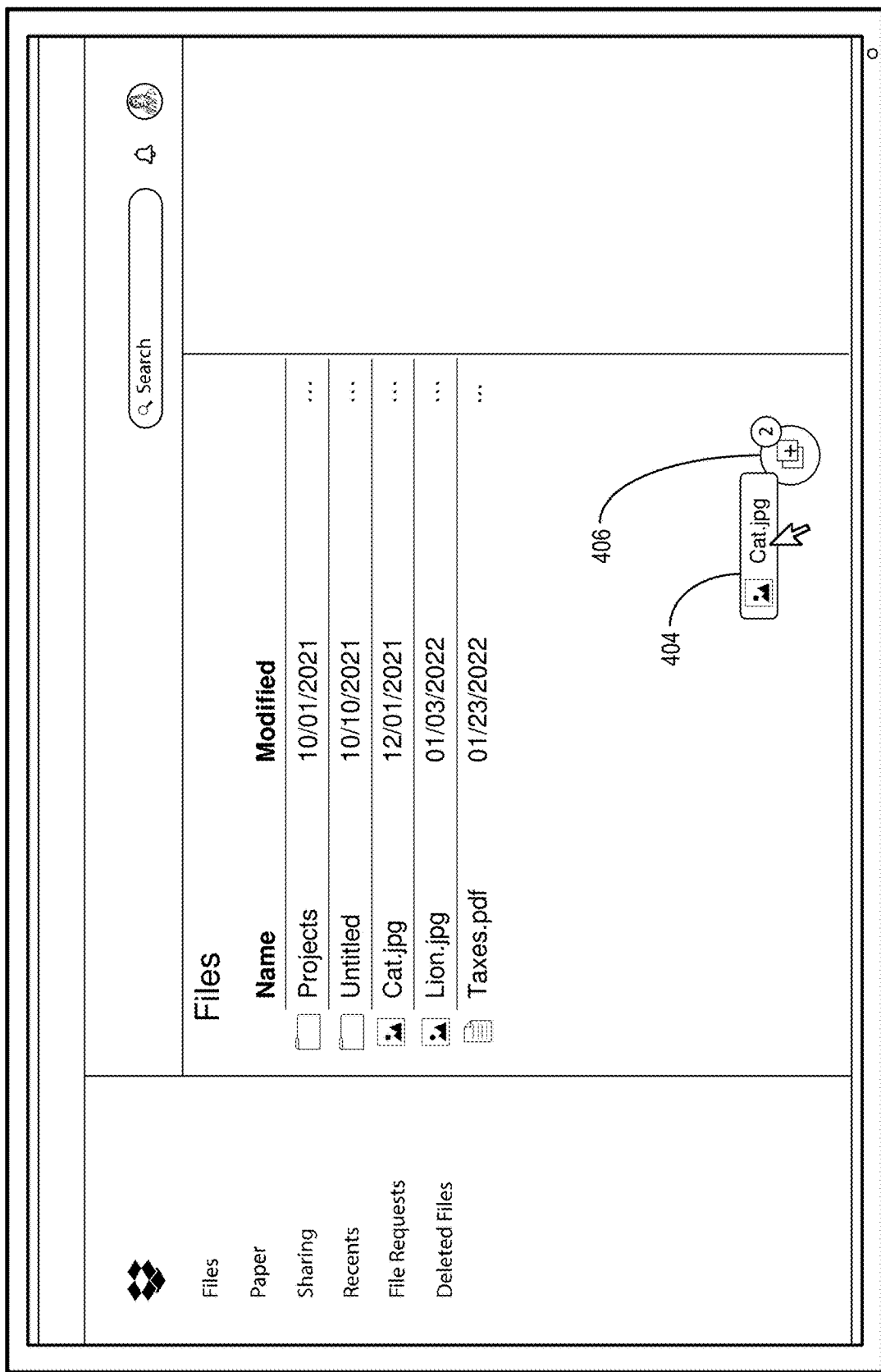
FIGS. 4A-4C illustrate example web browser interfaces for managing content items within a batch action clipboard via a clipboard element in accordance with one or more embodiments.
Figure 4B:
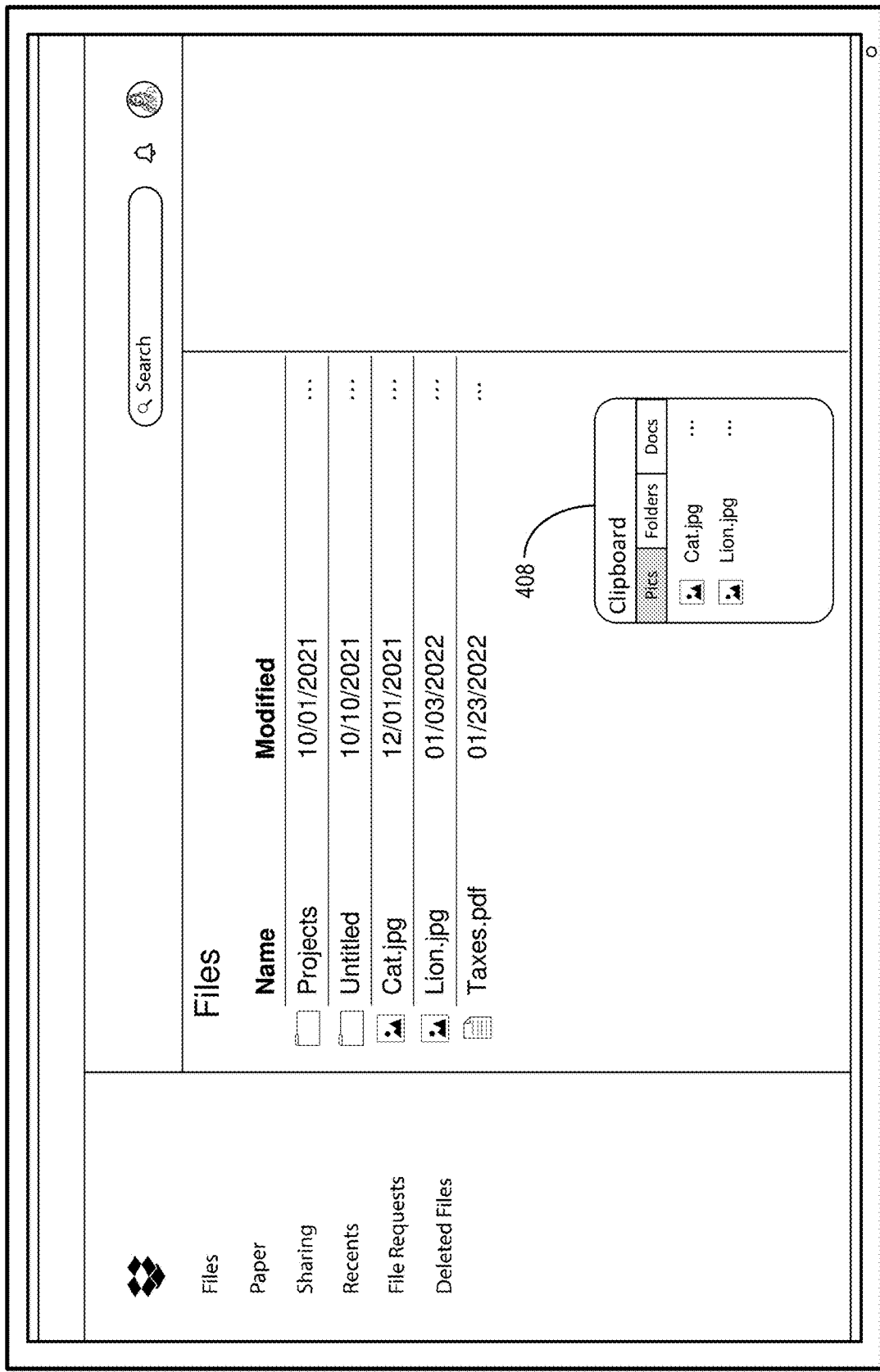
Figure 4C:
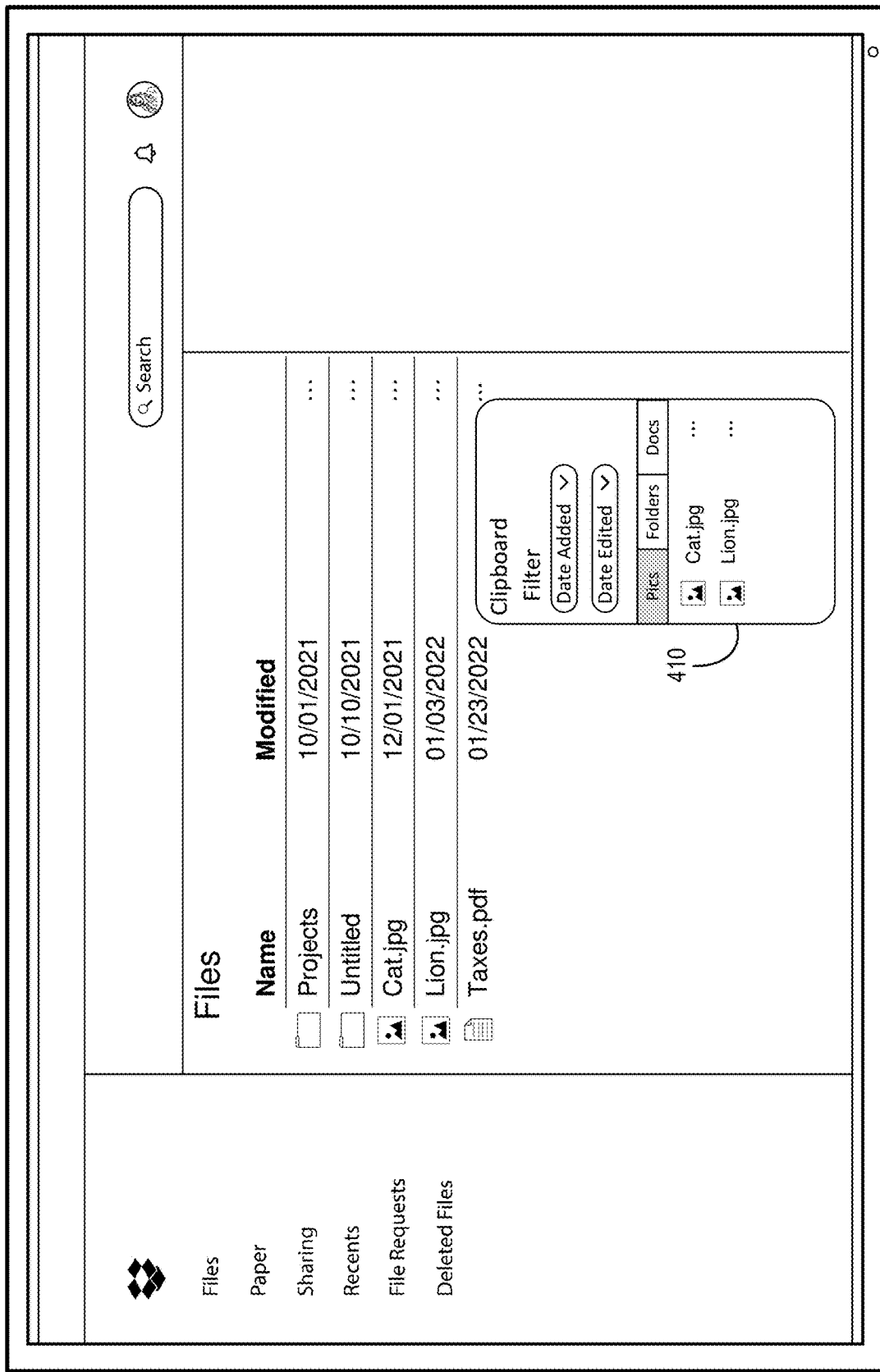

As mentioned above, in certain embodiments, the smart clipboard system 102 can add item references to and remove item references from a batch action clipboard based on various client device interactions. In particular, the smart clipboard system 102 can receive copy requests in various forms such as a selection of a copy option within a menu or a click and drag from a web-based folder into a clipboard element. In addition, the smart clipboard system 102 manage and arrange item references within a batch action clipboard using various organizational tools. FIGS. 4A-4C illustrate adding and managing item references in a batch action clipboard in accordance with one or more embodiments.

As illustrated in FIG. 4A, the client device 108 displays a web browser interface 402 including a clipboard element 406 and a content item 404. As shown, the smart clipboard system 102 receives a copy request in the form of a drag and drop input or a click and drag input. To elaborate, the smart clipboard system 102 receives a client device interaction from the client device 108 indicating a selection of a content item 404 and movement of the content item 404 onto or into a clipboard element 406. In response to the indication to drop the content item 404 on the clipboard element 406, the smart clipboard system 102 further generates and adds a corresponding item reference to the batch action clipboard and to the clipboard element 406 for display. In certain cases, the smart clipboard system 102 receives a copy request in the form of a click and drag of a web-based folder containing multiple content items, and the smart clipboard system 102 adds item references for each content item within the folder.

As illustrated in FIG. 4B, the smart clipboard system 102 provides organizational tools for a batch action clipboard such as tabs to arrange item references by content type (or according to some other content attributes). For example, the smart clipboard system 102 provides a number of tabs for arranging item references according to content type of their corresponding content items (or according to some other content attributes). In certain cases, the smart clipboard system 102 analyzes item references (and/or corresponding content items) to determine content attributes such as content types (e.g., documents, images, spreadsheets, or links), file sizes, content item names, timestamps of when content items were added to the web-based folder (or created originally or last modified), and/or indications of whether content items are private (e.g., specific to a single user account) or shared (e.g., accessible by multiple user accounts). The smart clipboard system 102 can further generate tabs within the clipboard element 408 to (automatically) arrange the item references according to one or more of the aforementioned content attributes.

In some embodiments, the smart clipboard system 102 adds, and creates labels for, new tabs based on client device interactions defining the tabs. Additionally, the smart clipboard system 102 can receive client device interactions to move item references from one tab to another within the clipboard element 408. In other embodiments, the smart clipboard system 102 automatically (e.g., without requiring user input) determines numbers and labels for various tabs for organizing item references based on analyzing the content items to determine content attributes. As shown, the smart clipboard system 102 generates a "Pies" tab, a "Folders" tab, and a "Docs" tab within the clipboard element 408 and arranges item references accordingly.

As illustrated in FIG. 4C, the smart clipboard system 102 provides filtering tools or filtering options for filtering through item references within a batch action clipboard. To elaborate, the smart clipboard system 102 provides tools to filter out item references (e.g., by removing or disabling the item references within a clipboard element while still maintaining them within the batch action clipboard) that do not satisfy criteria of selected filtering options. For example, the smart clipboard system 102 filters out item references for content items that are too big, too small, of the wrong file type, that do not satisfy a particular timestamp filtering option, or based on some other filtering option. In some cases, the smart clipboard system 102 automatically determines filtering options to select (from among a set of possible filtering options) for a batch action clipboard based on analyzing the item references within the batch action clipboard and/or their respective content items. In other cases, the smart clipboard system 102 receives client device interactions selecting filtering options from among a set of available filtering options. As shown, the clipboard element 410 displayed on the client device 108 in FIG. 4C includes filtering options for filtering by "Date Added" and "Date Edited."

Figure 5:
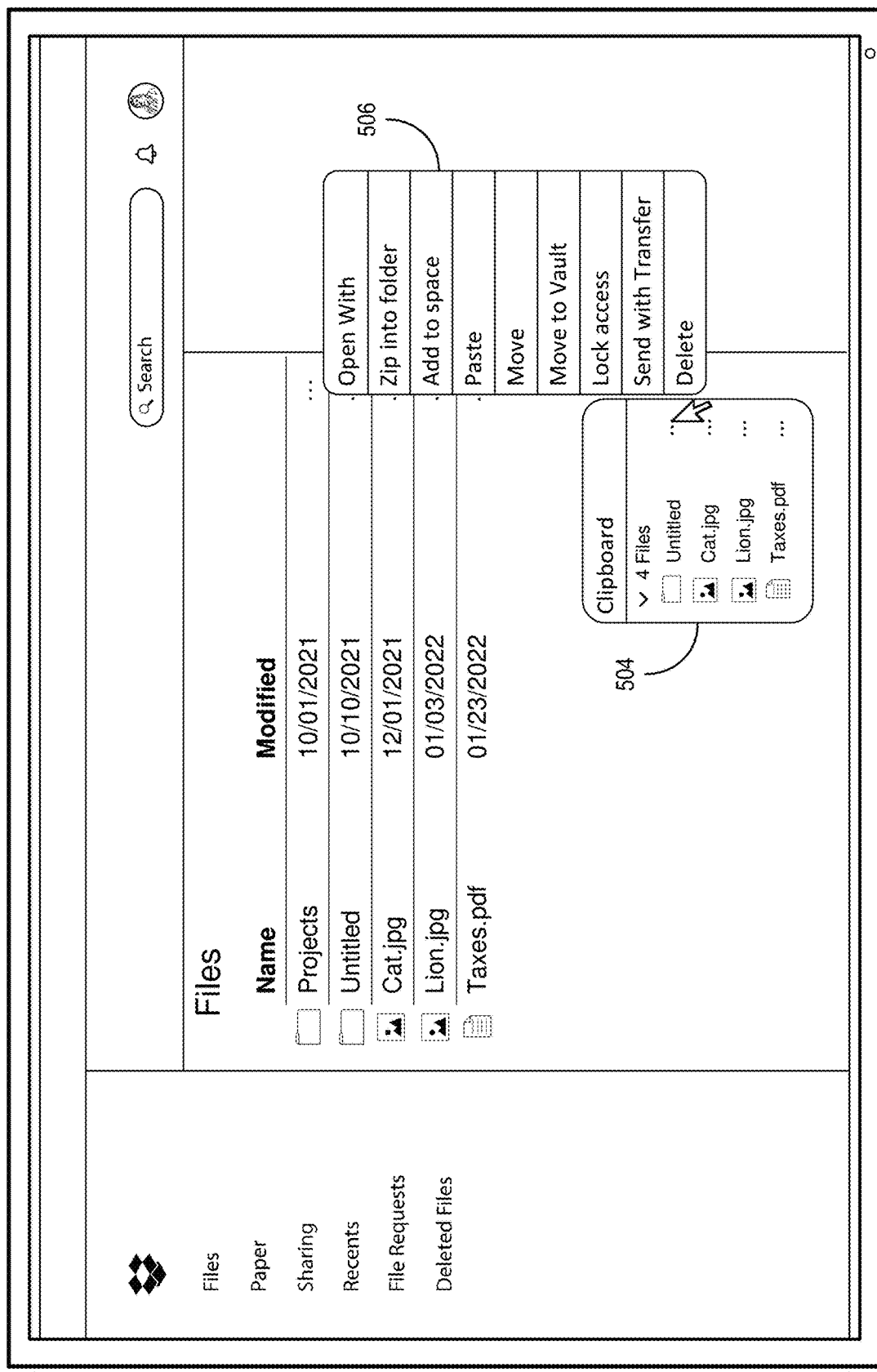
FIG. 5 illustrates an example web browser interface for accessing batch actions for a batch action clipboard in accordance with one or more embodiments.

As mentioned above, in certain described embodiments, the smart clipboard system 102 performs batch actions on multiple content items together. In particular, the smart clipboard system 102 can perform batch actions on one or more content items corresponding to item references within a batch action clipboard. FIG. 5 illustrates a web browser interface including an action menu for performing batch actions in accordance with one or more embodiments.

As illustrated in FIG. 5, the client device 108 displays a web browser interface 502 including an expanded version of a clipboard element 504 and an action menu 506. Indeed, the smart clipboard system 102 can provide a selectable option to view or open the action menu 506 (e.g., the ellipsis within the clipboard element 504). Within the action menu 506, the smart clipboard system 102 provides a set of selectable batch action options for various batch actions. For example, the smart clipboard system 102 can open content items directly from a batch action clipboard (without requiring navigation to each individual folder where the content items are stored). For each of the batch actions shown in the action menu 506, the smart clipboard system 102 can perform or execute the required processes on multiple content items of various content types and/or in various storage locations (e.g., web-based folders) together in a single action (e.g., in response to a single client device interaction).

To elaborate, in response to a selection of an open option (e.g., "open with") from the action menu 506, the smart clipboard system 102 can open one or more content items—or can access a particular application for opening the one or more content items. When performing a batch open for multiple content items, the smart clipboard system 102 opens each content item corresponding to a selected item reference from the batch action clipboard. In some cases, the smart clipboard system 102 opens multiple content items of different types with a batch open action. To perform a batch open on content items of different types, the smart clipboard system 102 identifies and selects (or provides an option for the client device 108 to indicate) which application to use for opening the respective content items. In certain embodiments, the smart clipboard system 102 automatically selects compatible applications for opening each content item. In other embodiments, the smart clipboard system 102 provides, for each content item to be opened as part of the batch open, a menu of compatible applications installed on the client device 108 for opening the respective content item.

As further illustrated in FIG. 5, the smart clipboard system 102 can perform or execute a batch zip action. To perform a batch zip, the smart clipboard system 102 can zip or compress multiple content items (of different types and stored in different web-based folders) into a single zip file at a designated location (e.g., a designated web-based folder). For example, in response to a client device interaction selecting a batch zip action element from the action menu 506, the smart clipboard system 102 identifies one or more content items corresponding to item references selected for performing the batch zip action, accesses respective web-based folders where the content items are stored, compresses or zips each of the content items into a zip folder, and stores the zip folder in a location designated by the client device 108.

Additionally, in some cases, the smart clipboard system 102 performs a batch add to space action. In particular, the smart clipboard system 102 adds, with a single action, multiple content items corresponding to item references selected within a batch action clipboard. For instance, the smart clipboard system 102 copies the item references from the batch action clipboard to a designated space (e.g., a space within the content management system 106). In some cases, a "space" refers to network location for storing item references for content items, where client devices (e.g., the client device 108) can access the corresponding content items by selecting the item references and where the content items are updated each time they are selected or opened via the item references to reflect modifications made since the previous open (e.g., so the item references are always up to date, thereby preventing the need for constantly copying the actual content items to the space with each new modification). In certain embodiments, the smart clipboard system 102 copies the same item references from the batch action clipboard to the space, while in other embodiments the smart clipboard system 102 generates new space-specific item references that contain the same or different information from those in the batch action clipboard.

As further illustrated in FIG. 5, the smart clipboard system 102 performs a batch paste action. To elaborate, the smart clipboard system 102 can receive a client device interaction with a paste option from the action menu 506 to paste content items corresponding to selected item references to a designated location (e.g., a designated web-based folder). To perform a batch paste, the smart clipboard system 102 accesses the web-based folders where the content items of selected item references are stored, copies each content item of the selected item references, and pastes the copied content items to a designated web-based folder. The smart clipboard system 102 retains the original versions of the copied content items in their respective web-based folders as part of a batch paste action.

For a batch move action, on the other hand, the smart clipboard system 102 moves the content items of selected item references to a designated web-based folder. Specifically, the smart clipboard system 102 removes the content items from their original locations and relocates them to the designated web-based folder.

As shown, the smart clipboard system 102 can also perform a batch move to vault action. More specifically, the smart clipboard system 102 can move content items corresponding to selected item references to a vault within the content management system 106. For example, the smart clipboard system 102 can generate or identify a designated vault location in the form of a network location (e.g., a web-based folder) that requires additional credentials to access (e.g., beyond account login credentials). In some cases, a vault requires an additional password, passcode, and/or biological authentication to gain access to its contents. In certain embodiments, the smart clipboard system 102 requires the client device 108 to provide the vault-specific authentication to perform a batch move to vault action to move content items to a vault location.

As further illustrated in FIG. 5, the smart clipboard system 102 performs a batch lock access action. In particular, the smart clipboard system 102 locks access to multiple content items corresponding to selected item references in the batch action clipboard. By locking access to the content items, the smart clipboard system 102 prevents all other user accounts (other than the user account of the client device 108 requesting the lock action) from accessing the content items. In some cases, the smart clipboard system 102 retains the content items in their respective storage locations (e.g., web-based folders) but prevents other devices and/or user accounts from opening or otherwise manipulating them. In certain embodiments, the smart clipboard system 102 provides a visual indicator in relation to locked content items (e.g., a lock symbol) to indicate that a content item is locked within a user interface.

In one or more embodiments, the smart clipboard system 102 performs a batch send with transfer action. More specifically, the smart clipboard system 102 can generate a transfer for multiple content items corresponding to selected item references within a batch action clipboard. For instance, the smart clipboard system 102 can generate a transfer location (e.g., a temporary location from which content items can be accessed/downloaded) and can add selected item references to the transfer location to make the content items corresponding to the item references available for download. In some cases, the smart clipboard system 102 can specify recipient accounts or devices for the transfer and can prevent other accounts or devices not specified as recipients from accessing the item references or the content items in the temporary transfer location. The smart clipboard system 102 can also set an expiration date (or a lifespan) for a transfer along with an indication to notify the user account when other client devices or user accounts download content items from the transfer.

As shown, the smart clipboard system 102 can further perform a batch delete action. In particular, the smart clipboard system 102 can delete or remove content items from their respective storage locations (e.g., web-based folders) in response to a client device interaction to perform a batch delete action.

In some embodiments, the smart clipboard system 102 performs one or more of the aforementioned batch actions without requiring selection of content items. To elaborate, the image differential system 102 receives a user interaction to select and perform a batch action with respect to content items within a batch action clipboard without necessarily receiving a user interaction to select content items within the batch action clipboard. For example, the smart clipboard system 102 identifies three content items within a batch action clipboard and, in response to receiving a request to perform a batch action for the entire batch action clipboard, the smart clipboard system 102 performs the batch action on each of the three content items by virtue of their being within the batch action clipboard (even if unselected within the clipboard element 504).

Figure 6A:
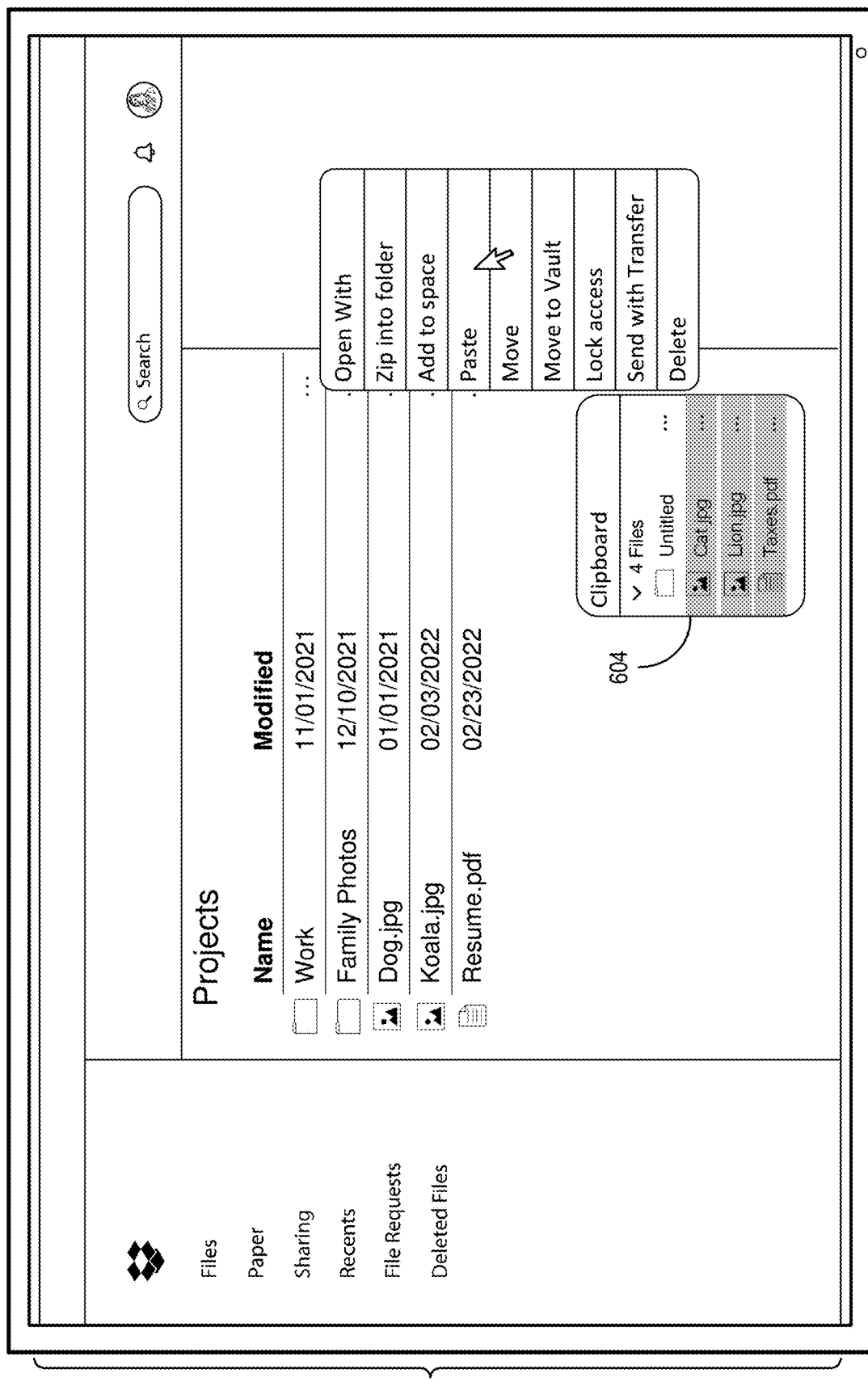
FIGS. 6A-6C illustrate example web browser interfaces for updating a clipboard element based on performing batch actions in accordance with one or more embodiments.
Figure 6B:
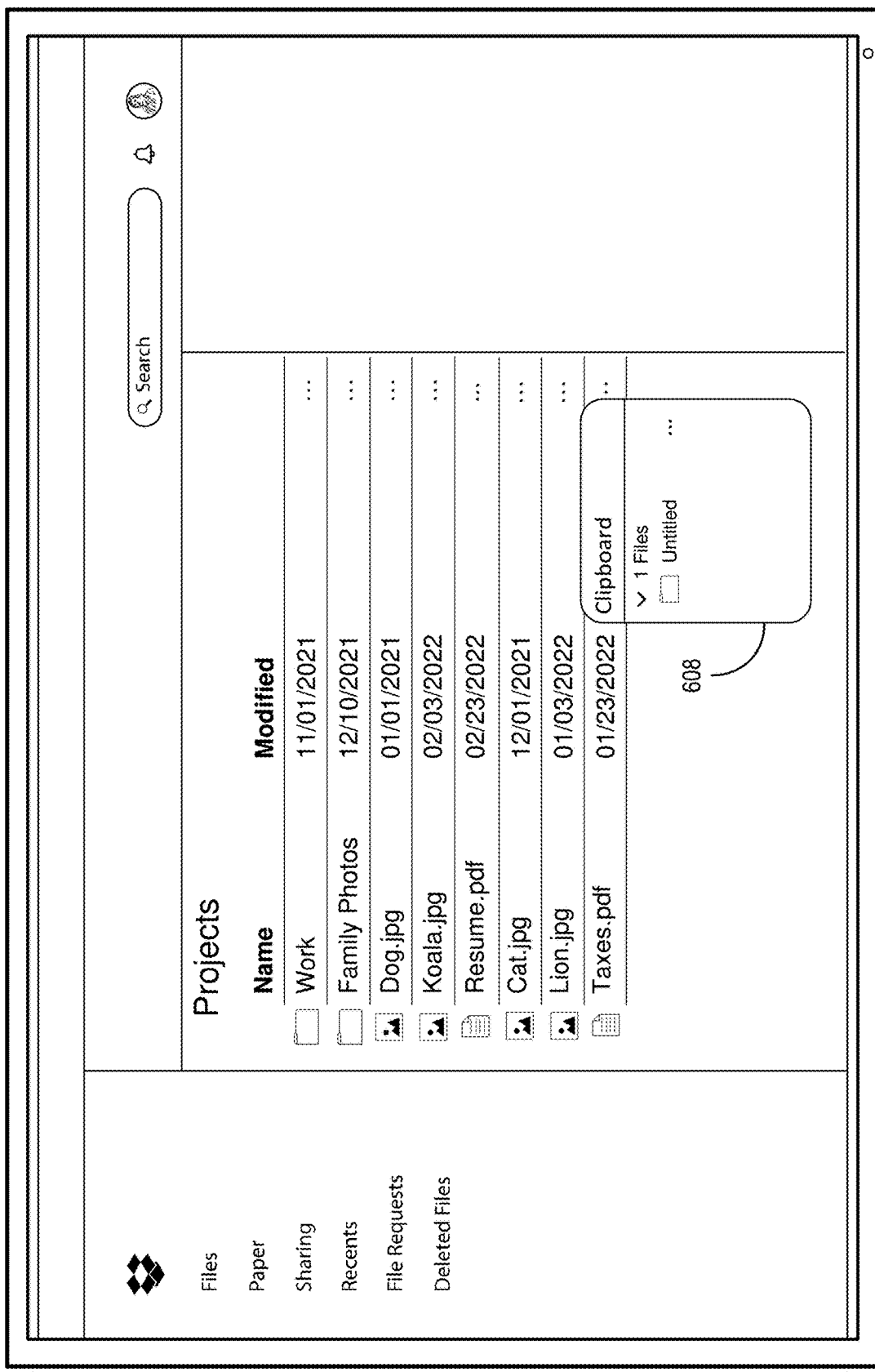
Figure 6C:
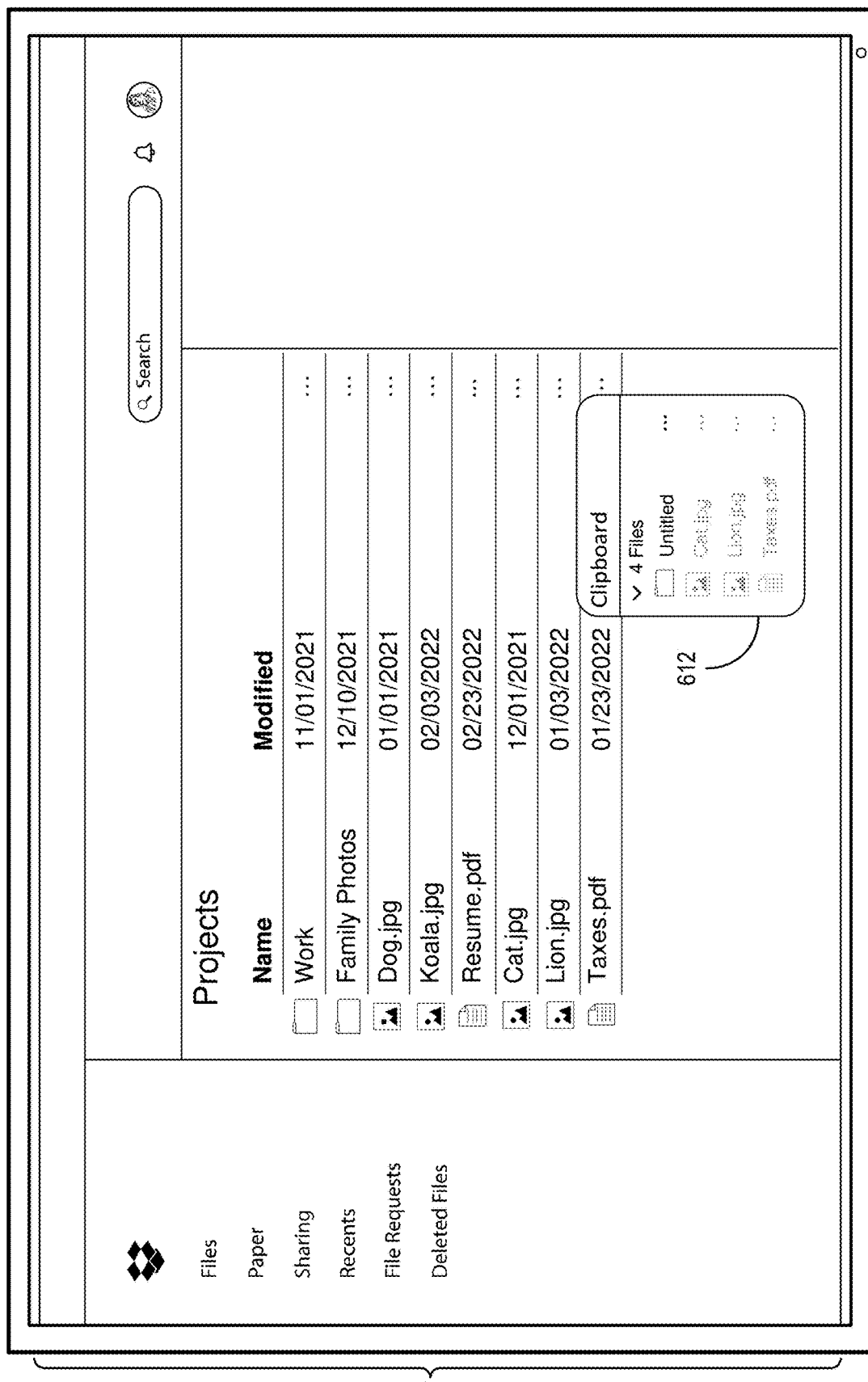

As mentioned above, in certain embodiments, the smart clipboard system 102 updates or modifies a batch action clipboard and/or a clipboard element based on performing a batch action. In particular, the smart clipboard system 102 updates the batch action clipboard to indicate that an action has been taken on one or more content items corresponding to item references in the batch action clipboard. FIGS. 6A-6C illustrate examples updated clipboard elements for batch action clipboards updated based on performing batch actions in accordance with one or more embodiments.

As illustrated in FIG. 6A, the smart clipboard system 102 performs a batch paste action. Indeed, the client device 108 displays a web browser interface 602 that includes a clipboard element 604 of a batch action clipboard. As shown, the clipboard element 604 indicates multiple selected item references corresponding to different content items (of different types and/or in different web-based folders). As shown, the smart clipboard system 102 receives a client device interaction indicating a selection of a batch paste action to paste the content items of the selected item references in a particular web-based folder (e.g., the "Projects" folder indicated in the web browser interface 602). Based on the client device interaction and/or based on performing the batch paste action (or some other batch action), the smart clipboard system 102 modifies or updates the batch action clipboard and/or the corresponding clipboard element 604.

As illustrated in FIG. 6B, the web browser interface 606 includes a modified clipboard element 608. Indeed, the smart clipboard system 102 modifies the batch action clipboard and the clipboard element 604 to reflect or indicate that a batch action has been performed on one or more content items. To elaborate, the smart clipboard system 102 can modify the clipboard element 604 in different ways based on performing a batch action. As shown in FIG. 6B, the smart clipboard system 102 generates the modified clipboard element 608 by removing item references (e.g., the "Cat," "Lion," and "Taxes" item references) from the clipboard element 604 (and from the batch action clipboard). Indeed, the smart clipboard system 102 can remove the item references from the batch action clipboard and the clipboard element 604 in response to performing a batch action on the corresponding item references.

As illustrated in FIG. 6C, the web browser interface 610 includes a modified clipboard element 612 that differs from the modified clipboard element 608 of FIG. 6B. As shown, the smart clipboard system 102 generates the modified clipboard element 612 by disabling and/or demoting one or more item references. Indeed, the smart clipboard system 102 can disable an item reference of a content item acted on via a batch action by graying out (or making unselectable) the item reference with a clipboard element (e.g., the modified clipboard element 612). As shown, the smart clipboard system 102 disables the item references for "Cat," "Lion," and "Taxes." In some cases, the smart clipboard system 102 provides a selectable option to clear item references from a batch action clipboard, such as item references corresponding to content items that have been acted on (e.g., that have been demoted or disabled).

In one or more embodiments, the smart clipboard system 102 reactivates or re-enables disabled item references based on client device interaction selecting a different batch action than the batch action that resulted in disabling the item references. Indeed, the smart clipboard system 102 can disable an item reference in an action-specific sense, where disabling an item reference in relation to (or in response to performing) a batch paste action does not disable the item reference in relation to a different batch action. Additionally (or alternatively), the smart clipboard system 102 can disable an item reference in a location-specific sense, where disabling an item reference in relation to one location (e.g., in response to pasting a content item to a particular web-based folder) does not disable the item reference in relation to another location (e.g., for pasting to another web-based folder).

In one or more embodiments, the smart clipboard system 102 can modify the clipboard element 604 and/or a batch action clipboard by demoting one or more item references. To elaborate, the smart clipboard system 102 relocates item references within the modified clipboard element 612 by, for instance, moving an item reference down within a list of item references. Indeed, in some cases, the smart clipboard system 102 adds item references to the batch action clipboard and lists them within the clipboard element 604 according to when they are added to the batch action clipboard (e.g., newest on top) and/or when actions are taken. Thus, in response to performing a batch action, the smart clipboard system 102 demotes an item reference to move it down the list (e.g., below item references of content items not yet acted on).

In some cases, the smart clipboard system 102 updates the clipboard element 604 and/or a batch action clipboard by providing a visual indicator indicating performance of a batch action. For example, the smart clipboard system 102 generates and provides a visual indicator (e.g., a particular symbol or a particular font color for an item reference) within a clipboard element (e.g., the clipboard element 604 or the modified clipboard element 612) in relation to an item reference to indicate that a batch action has been performed with respect to a corresponding content item. In certain embodiments, the smart clipboard system 102 provides an action-specific visual indicator (that visually represents a particular batch action) in relation to one or more item references to indicate that the smart clipboard system 102 has performed a batch paste, a batch move, a batch delete, or some other batch action in relation to corresponding content items.

In one or more embodiments, the smart clipboard system 102 further monitors batch actions taken for each content item corresponding to item references within a batch action clipboard. For instance, the smart clipboard system 102 identifies content items that have not been acted on for at least a threshold period of time (or a threshold number of application sessions). The smart clipboard system 102 can further generate and provide a notification for display on the client device 108 (e.g., a pop-up notification within a web browser interface, a push notification, a text notification, or an email notification) indicating one or more content items that have been dormant (not acted on) within a batch action clipboard for at least a threshold period of time and/or requesting action on the content item(s). In some embodiments, the smart clipboard system 102 generates a notification for each content item with a batch action clipboard that is dormant for a threshold period of time, while in other embodiments the smart clipboard system 102 generates notifications periodically to include indications of one or more content items dormant for the threshold period of time.

Figure 7:
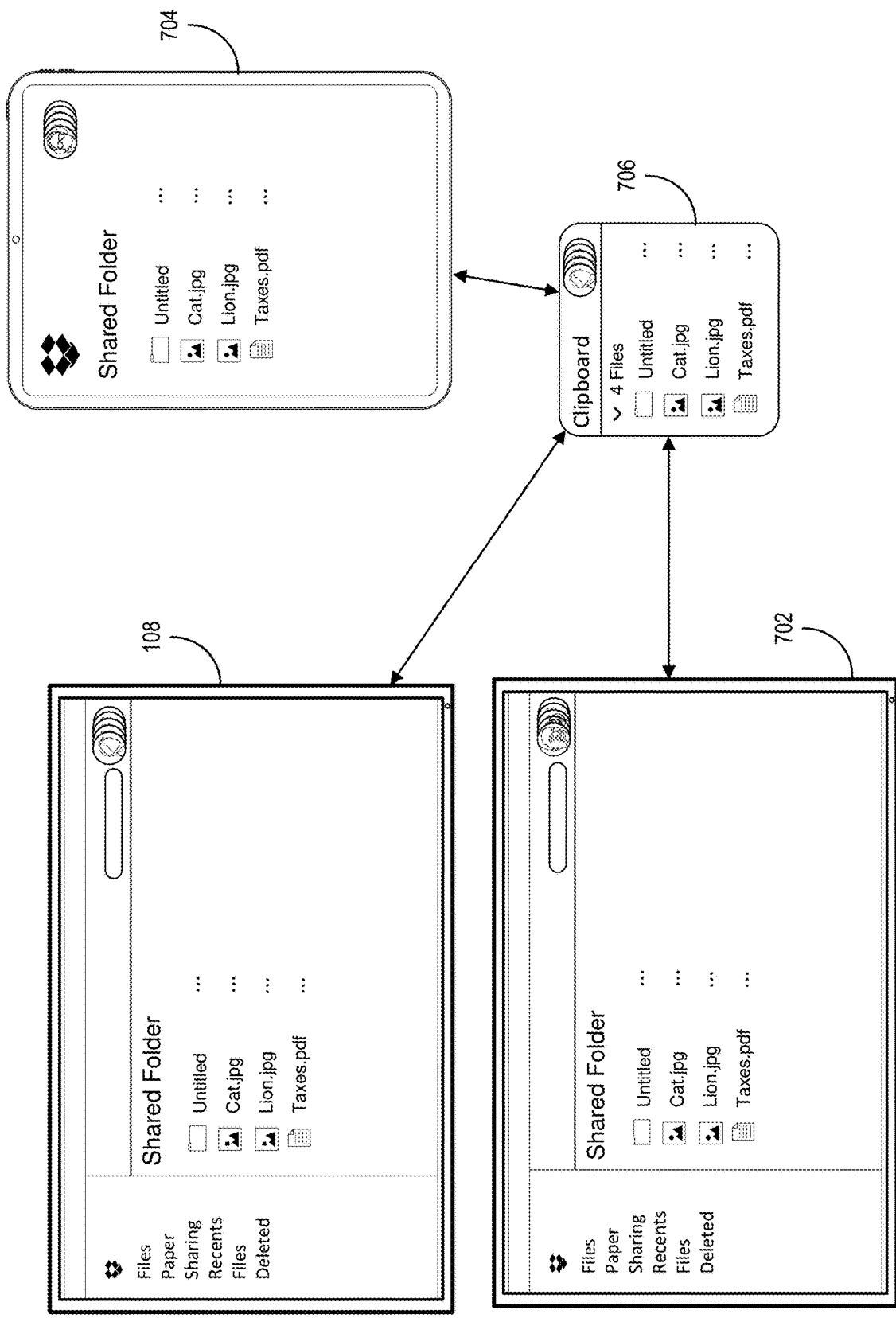
FIG. 7 illustrates an example collaborative batch action clipboard in accordance with one or more embodiments.

As mentioned, in certain described embodiments, the smart clipboard system 102 generates and provides a collaborative batch action clipboard. In particular, the smart clipboard system 102 provides a batch action clipboard that is accessible by multiple user accounts in collaboration within a common web-based folder, workspace, or project. FIG. 7 illustrates an example collaborative batch action clipboard in accordance with one or more embodiments.

As illustrated in FIG. 7, the smart clipboard system 102 provides access to a collaborative batch action clipboard 706 to client devices 108, 702, and 704. In particular, the smart clipboard system 102 identifies user accounts associated with the client device 108, 702, and 704 and determines that the user accounts are part of a collaborative team of user accounts permitted to access the "Shared Folder" web-based folder. As shown, the smart clipboard system 102 further enables the different collaborative user accounts to access the collaborative batch action clipboard 706 from different device types or device platforms (e.g., mobile phones, tablets, and computers).

To utilize the collaborative batch action clipboard 706, the smart clipboard system 102 can receive copy requests from each of the client devices 108, 702, and 704 to add item references to the collaborative batch action clipboard 706. For instance, once the smart clipboard system 102 adds an item reference in response to a copy request from the client device 108, the smart clipboard system 102 enables the client device 702 and the client device 704 to access the item reference from the batch action clipboard 706. Indeed, the smart clipboard system 102 can generate and provide—and receive client device interactions from—device-specific clipboard elements for display on each of the client devices 108, 702, 704, respectively.

In some cases, the smart clipboard system 102 restricts content items copyable to the collaborative batch action clipboard 706. For example, the smart clipboard system 102 identifies folders that are part of a collaborative project or associated with a collaboration team and prevents client devices from copying content items outside of those folders into the collaborative batch action clipboard 706. In some embodiments, the smart clipboard system 102 does not restrict copying to the collaborative batch action clipboard 706 and permits the client devices 108, 702, and 704 associated with collaborative user accounts to copy content items from any storage location (local or network-based).

In some embodiments, the smart clipboard system 102 restricts destinations for content items within the collaborative batch action clipboard 706. To elaborate, the smart clipboard system 102 identifies web-based folders that are shared among the user accounts associated with the client devices 108, 702, and 704 and prevents pasting (or moving or otherwise interacting with) content items from the collaborative batch action clipboard 706 to other (non-shared) web-based folders. In other embodiments, the smart clipboard system 102 does not restrict destination locations in this way and instead enables the client devices 108, 702, and 704 associated with the collaborative user accounts to paste or move content items to other web-based folders.

In addition, the smart clipboard system 102 can receive client device interactions to perform batch actions on content items within the collaborative batch action clipboard 706. For instance, the smart clipboard system 102 can receive a client device interaction to perform a batch paste action for one or more content items within the collaborative batch action clipboard 706. In addition, the smart clipboard system 102 updates the client devices 108, 702, and 704 to reflect modifications made as a result of executing batch actions via the collaborative batch action clipboard 706. For instance, the smart clipboard system 102 updates clipboard elements on each of the client devices 108, 702, and 704 to remove, disable, or demote item references corresponding to content items that are acted on. In some cases, for the collaborative batch action clipboard 706, the smart clipboard system 102 leaves the item references until they are expressly removed in case multiple client devices perform actions on them.

Figure 8:
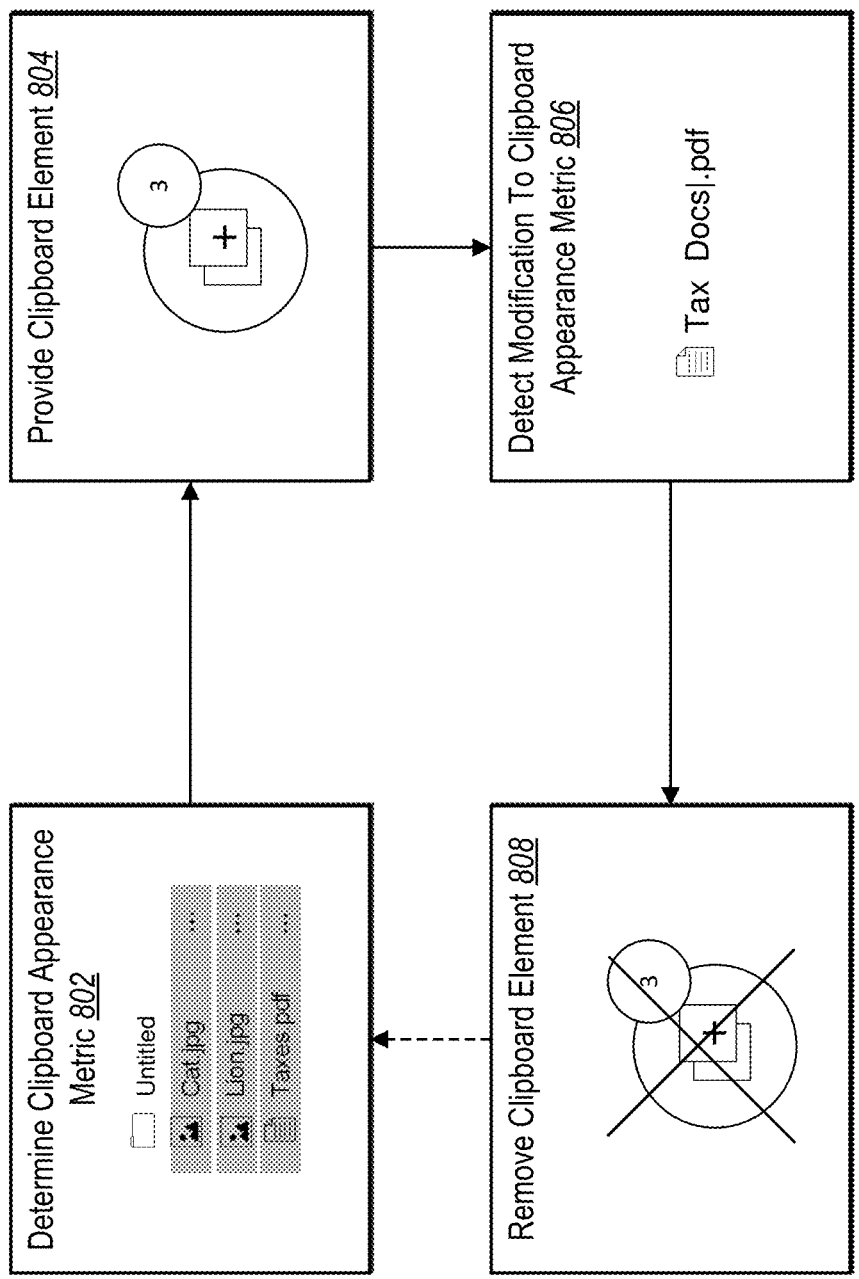
FIG. 8 illustrates an example sequence of acts for intelligently providing and removing a clipboard element in accordance with one or more embodiments.

As mentioned, in certain described embodiments, the smart clipboard system 102 intelligently provides and/or removes a clipboard element for display. In particular, the smart clipboard system 102 determines when a batch action clipboard is needed and/or not needed and provides or removes the clipboard element accordingly. FIG. 8 illustrates an example sequence of acts for intelligently providing and removing a clipboard element in accordance with one or more embodiments.

As illustrated in FIG. 8, the smart clipboard system 102 performs an act 802 to determine a clipboard appearance metric. More specifically, the smart clipboard system 102 determines a clipboard appearance metric that indicates a measure of need or a likelihood of providing for display a clipboard element for a batch action clipboard. For example, the smart clipboard system 102 determines a clipboard appearance metric by monitoring client device actions of a current application session and/or by analyzing historical client device actions from prior application sessions. The smart clipboard system 102 can detect occurrences of particular client device actions (or prior sessions or a current session) and can weight different actions according to their impact on the need for using a batch action clipboard. For instance, the smart clipboard system 102 can weight a copy request action heavily and can weight navigation actions less heavily. The smart clipboard system 102 can further to determine a clipboard appearance metric from a weighted combination of client device actions and can compare the clipboard appearance metric with an appearance metric threshold.

Based on determining that the clipboard appearance metric satisfies the appearance metric threshold, the smart clipboard system 102 performs an act 804 to provide a clipboard element. In particular, the smart clipboard system 102 provides a clipboard element for display within a web browser interface on a client device (e.g., the client device 108). In some cases, the smart clipboard system 102 provides a clipboard element based on a single copy request action. In other cases, the smart clipboard system 102 provides a clipboard element upon based on a combination of client device actions that, based on historical action patterns, result in the clipboard appearance metric satisfying an appearance metric threshold.

As further illustrated in FIG. 8, the smart clipboard system 102 performs an act 806 to detect a modification to a clipboard appearance metric. In particular, the smart clipboard system 102 continues to monitor client device actions to determine that a client device no longer needs a clipboard element for a batch action clipboard. For instance, the smart clipboard system 102 determines that a client device finishes a batch action from a batch action clipboard or determines that a threshold period of time has lapsed without interaction with a clipboard element, and the smart clipboard system 102 updates the clipboard appearance metric accordingly. Based on the update, in some cases, the smart clipboard system 102 reduces the clipboard appearance metric so that the metric no longer satisfies an appearance metric threshold.

Based on determining that the clipboard appearance metric no longer satisfies the appearance metric threshold, the smart clipboard system 102 performs an act 808 to remove the clipboard element. Indeed, the smart clipboard system 102 removes the clipboard element so that it is no longer displayed on a client device (e.g., the client device 108). As shown, the smart clipboard system 102 can repeat the acts 802-808 to continually monitor client device actions for assessing the need of a batch action clipboard (e.g., by determining and modifying a clipboard appearance metric).

Figure 9:
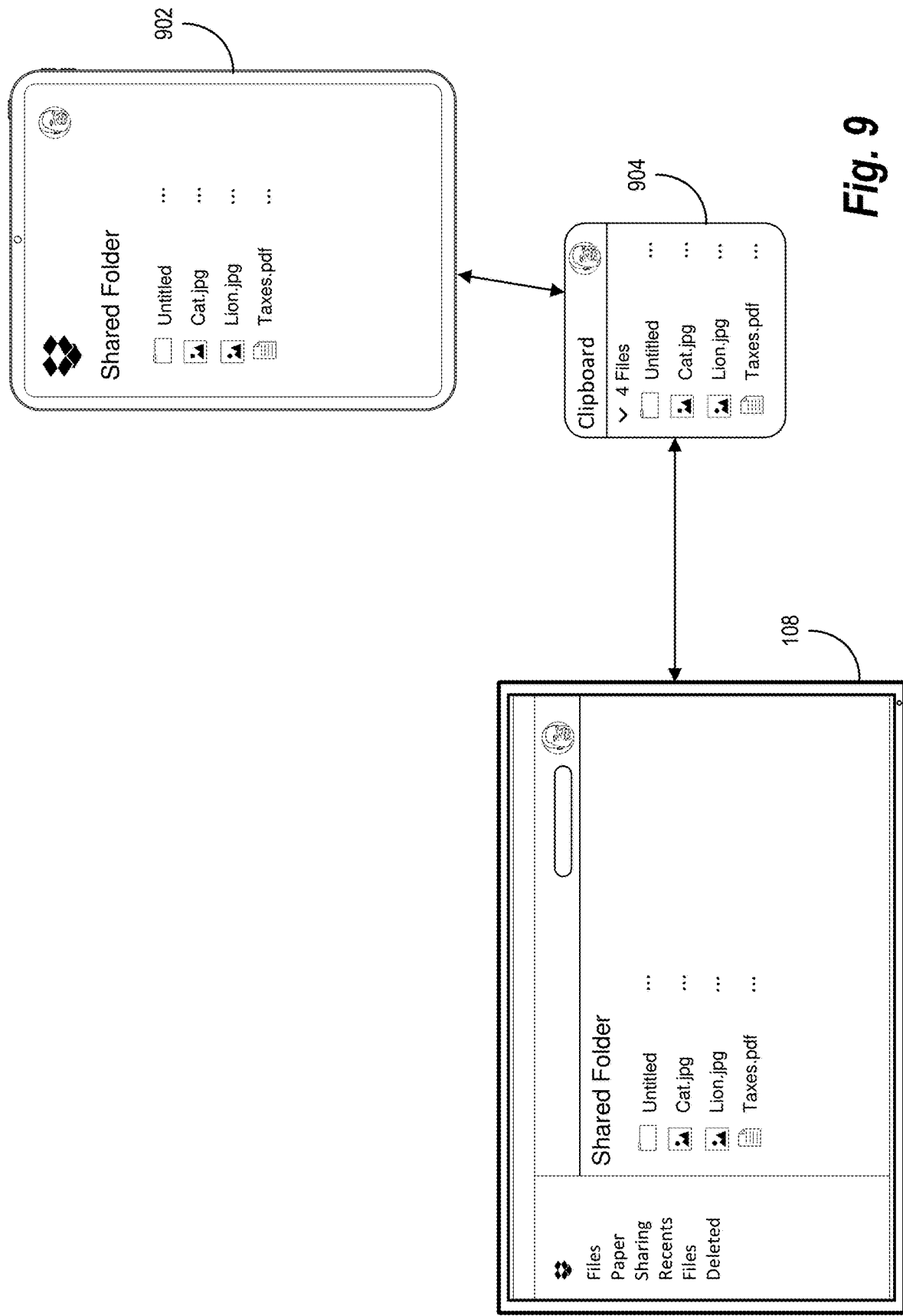
FIG. 9 illustrates an example batch action clipboard for managing content items across different device platforms in accordance with one or more embodiments.

In some cases, the smart clipboard system 102 maintains item references within a batch action clipboard across client devices and/or across application sessions associated with a particular user account. In particular, the smart clipboard system 102 enables a single user account to access a batch action clipboard via different client devices. FIG. 9 illustrates a cross-device (and/or cross-platform) batch action clipboard in accordance with one or more embodiments.

As illustrated in FIG. 9, the smart clipboard system 102 detects an application session on the client device 108 within a web browser interface of the content management system 106. The smart clipboard system 102 further detects an application session (for the same user account) on a client device 902 to access the same "Shared Folder" as the client device 108. The smart clipboard system 102 can receive a copy request from a first client device (e.g., the client device 108) and can add a corresponding item reference to the batch action clipboard 904. In addition, the smart clipboard system 102 can provide the batch action clipboard 904 to the client device 902 and can enable the client device 902 to access the item reference to perform a batch action.

As shown, the smart clipboard system 102 enables client devices of different types/platforms to access the batch action clipboard 904, such as the client device 108 (e.g., a computer) and the client device 902 (e.g., a tablet). In some cases, the smart clipboard system 102 further maintains a batch action clipboard across application sessions. For instance, the smart clipboard system 102 receives a copy request from the client device 108 in a first application session. In a subsequent application session (e.g., after termination of the previous session and a new login), the smart clipboard system 102 can provide, within a batch action clipboard, item references for the copied content item(s) associated with the copy request from the previous session.

The components of the smart clipboard system 102 can include software, hardware, or both. For example, the components of the smart clipboard system 102 can include one or more instructions stored on a computer-readable storage medium and executable by processors of one or more computing devices. When executed by one or more processors, the computer-executable instructions of the smart clipboard system 102 can cause a computing device to perform the methods described herein. Alternatively, the components of the smart clipboard system 102 can comprise hardware, such as a special purpose processing device to perform a certain function or group of functions. Additionally or alternatively, the components of the smart clipboard system 102 can include a combination of computer-executable instructions and hardware.

Furthermore, the components of the smart clipboard system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the smart clipboard system 102 may be implemented as part of a stand-alone application on a personal computing device or a mobile device.

FIGS. 1-9, the corresponding text, and the examples provide a number of different systems and methods for generating and maintaining a web-based batch action clipboard. In addition to the foregoing, implementations can also be described in terms of flowcharts comprising acts steps in a method for accomplishing a particular result. For example, FIG. 10 illustrates a series of acts 1000 for generating and maintaining a web-based batch action clipboard.

Figure 10:
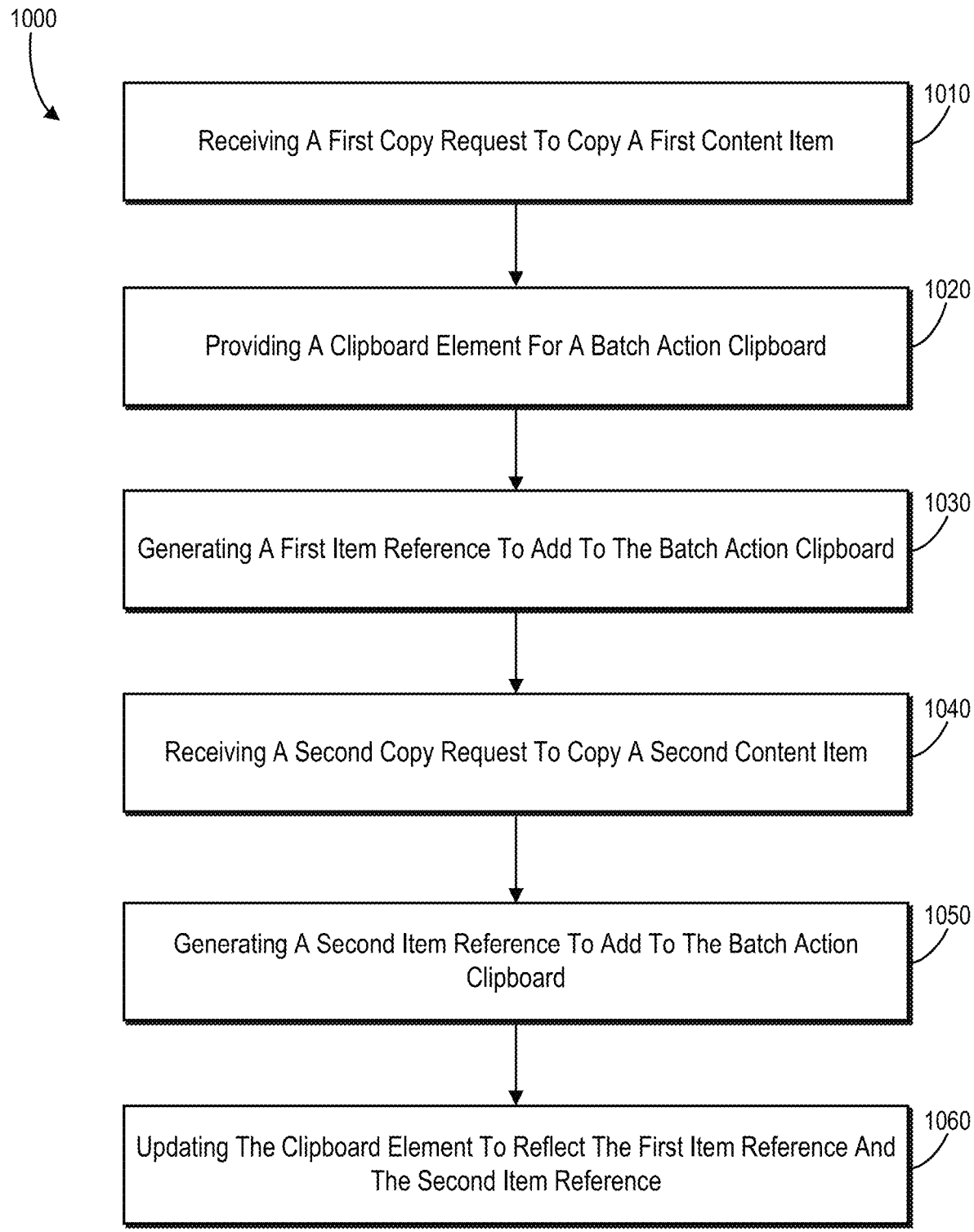
FIG. 10 illustrates a flowchart of a series of acts of generating and maintaining a batch action clipboard in accordance with one or more embodiments.

While FIG. 10 illustrates acts according to one implementation, alternative implementations may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further implementations, a system can perform the acts of FIG. 10.

As illustrated in FIG. 10, the series of acts 1000 may include an act 1010 of receiving a first copy request to copy a first content item. For example, the act 1010 can involve receiving, from a client device associated with a content management system, a first copy request to copy a first content item from a web-based folder (or from a first webpage of a web-based content management platform). In some cases, the act 1010 involves receiving a client device interaction via a web browser interface associated with the content management system to copy the first content item from the web-based folder maintained by the content management system remotely from the client device.

As also illustrated in FIG. 10, the series of acts 1000 may include an act 1020 of providing a clipboard element for a batch action clipboard. In particular, the act 1020 can involve, in response to the first copy request, providing, for display on the client device, a clipboard element representing a batch action clipboard for performing batch actions on content items.

Additionally, the series of acts 1000 may include an act 1030 of generating a first item reference to add to the batch action clipboard. In particular, the act 1030 can involve, in response to the first copy request, generating and adding a first item reference corresponding to the first content item to the batch action clipboard.

Further, the series of acts 1000 may include an act 1040 of receiving a second copy request to copy a second content item. In particular, the act 1040 can involve receiving a second copy request from the client device to copy a second content item from an additional web-based folder (or from a second webpage of the web-based content management platform).

As further illustrated in FIG. 10, the series of acts 1000 may include an act 1050 of generating a second item reference to add to the batch action clipboard. In particular, the act 1050 can involve, in response to the second copy request, generating and adding a second item reference corresponding to the second content item to the batch action clipboard.

In addition, the series of acts 1000 can include an act 1060 of updating the clipboard element to reflect the first item reference and the second item reference. In particular, the act 1060 can involve, in response to the second copy request, updating the clipboard element for display on the client device to reflect the first item reference and the second item reference. In some cases, the series of acts 1000 includes an act of executing a batch action on the first content item and the second content item together based on a client device interaction in relation to the first item reference and the second item reference.

In some embodiments, the series of acts 1000 includes an act of providing, for display on the client device in relation to the clipboard element representing the batch action clipboard, an action menu including a set of selectable action elements for performing corresponding actions on one or more of the first content item or the second content item. In these or other embodiments, the series of acts 1000 includes an act of receiving a client device interaction from the client device selecting a selectable action element from the action menu for performing a batch action on the first content item and the second content item together. Additionally, the series of acts 1000 can include an act of executing the batch action on the first content item and the second content item in response to the client device interaction.

The series of acts 1000 can include an act of detecting an additional session within the content management system for a user account associated with the client device. Additionally, the series of acts 1000 can include an act of providing, for display on the client device in response to detecting the additional session, a visual representation of a clipboard history indicating the first item reference and the second item reference copied from a previous session of the user account within the content management system. In some cases, the series of acts 1000 includes an act of detecting, at a second client device, an additional session for a user account associated with the client device. Further, the series of acts 1000 can include an act of providing, for display on the second client device in response to detecting the additional session, a second clipboard element reflecting the first item reference and the second item reference copied via the client device.

In some embodiments, the series of acts 1000 includes an act of receiving, from the client device, a client device interaction within the clipboard element to execute an action on the first content item. In addition, the series of acts 1000 can include an act of demoting the first item reference within the clipboard element in response to the client device interaction to execute the action. In certain cases, the series of acts 1000 includes an act of receiving, from the client device, a client device interaction to click and drag a third content item from the web-based folder to the clipboard element. The series of acts 1000 can also include an act of, in response to the client device interaction to click and drag the third content item, adding a third item reference corresponding to the third content item to the clipboard element.

The series of acts 1000 can include an act of maintaining, across multiple sessions within the content management system, a clipboard history comprising a chronological arrangement of item references representing copied content items. In addition, the series of acts 1000 can include acts of receiving a client device interaction from the client device to expand the clipboard element and, in response to the client device interaction, providing a previous session indicator within an expanded version of the clipboard element indicating content items copied from a previous session within the content management system. In some cases, the series of acts 1000 includes an act of receiving a client device interaction selecting the first item reference and requesting to open first content item directly from the clipboard element and an act of, in response to the client device interaction, opening the first content item directly from the batch action clipboard.

In one or more embodiments, the series of acts 1000 includes an act of providing, within the clipboard element, a selectable option to view a set of batch actions for performing on multiple content items together. The series of acts 1000 can also include an act of executing, in response to a selection of a batch action from the set of batch actions, the batch action on the first content item and the second content item together. In some cases, the series of acts 1000 includes an act of receiving a client device interaction with the first item reference to perform an action on the first content item and an act of, based on the client device interaction, automatically removing the first item reference corresponding to the first content item from the batch action clipboard upon performing the action on the first content item. The series of acts 1000 can also include an act of providing, for display within the clipboard element, one or more tabs selectable to view item references corresponding to content items arranged according to content type.

In certain embodiments, the series of acts 1000 includes an act of receiving a client device interaction with the first item reference and the second item reference to paste the first content item and the second content item to a selected web-based folder. The series of acts 1000 can also include acts of, in response to the client device interaction to paste the first content item and the second content item: retrieving the first content item from a first location within the web-based folder indicated by the first item reference, retrieving the second content item from a second location within the additional web-based folder indicated by the second item reference, and copying the first content item from the first location within the web-based folder and the second content item from the second location within the additional web-based folder to the selected web-based folder.

The series of acts 1000 can include an act of determining that the first item reference remains within the batch action clipboard for a threshold period of time without executing an action on the first content item. The series of acts 1000 can also include an act of, in response to determining that the first item reference remains within the batch action clipboard for the threshold period of time, providing a notification to the client device requesting action on the first content item.

In some cases, the series of acts 1000 can include an act of providing, within the clipboard element, one or more filtering options selectable to filter item references within the batch action clipboard according to content attributes.

In one or more embodiments, the series of acts 1000 includes an act of receiving a client device interaction with the first item reference to perform an action on the first content item. The series of acts 1000 can include an act of, based on the client device interaction, disabling the first item reference corresponding to the first content item within the batch action clipboard upon performing the action on the first content item. Additionally, the series of acts 1000 can include an act of providing the batch action clipboard to a collaborative group of user accounts with access to the web-based folder and the additional web-based folder and an act of enabling the collaborative group of user accounts to add and remove item references within the batch action clipboard from respective client devices.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
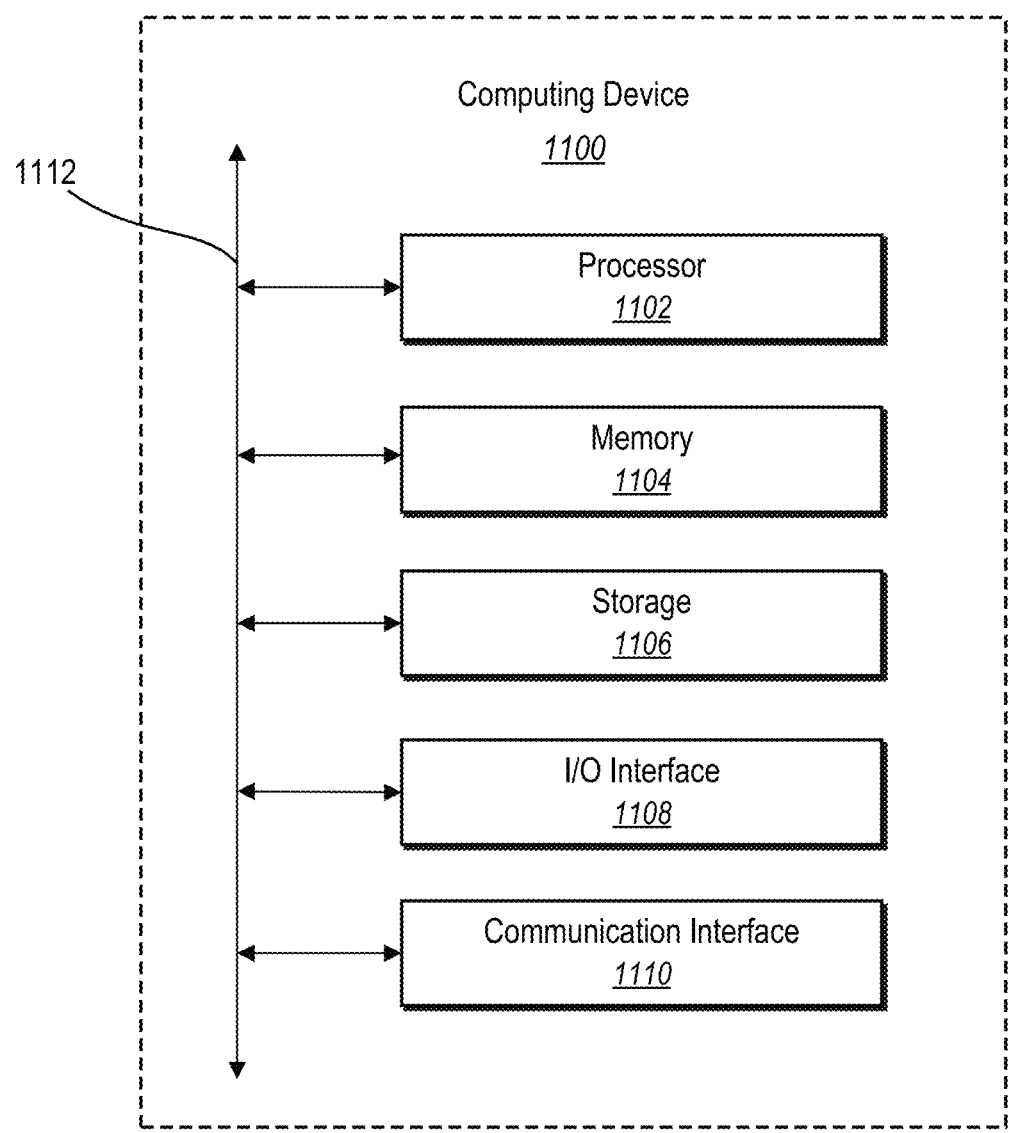
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
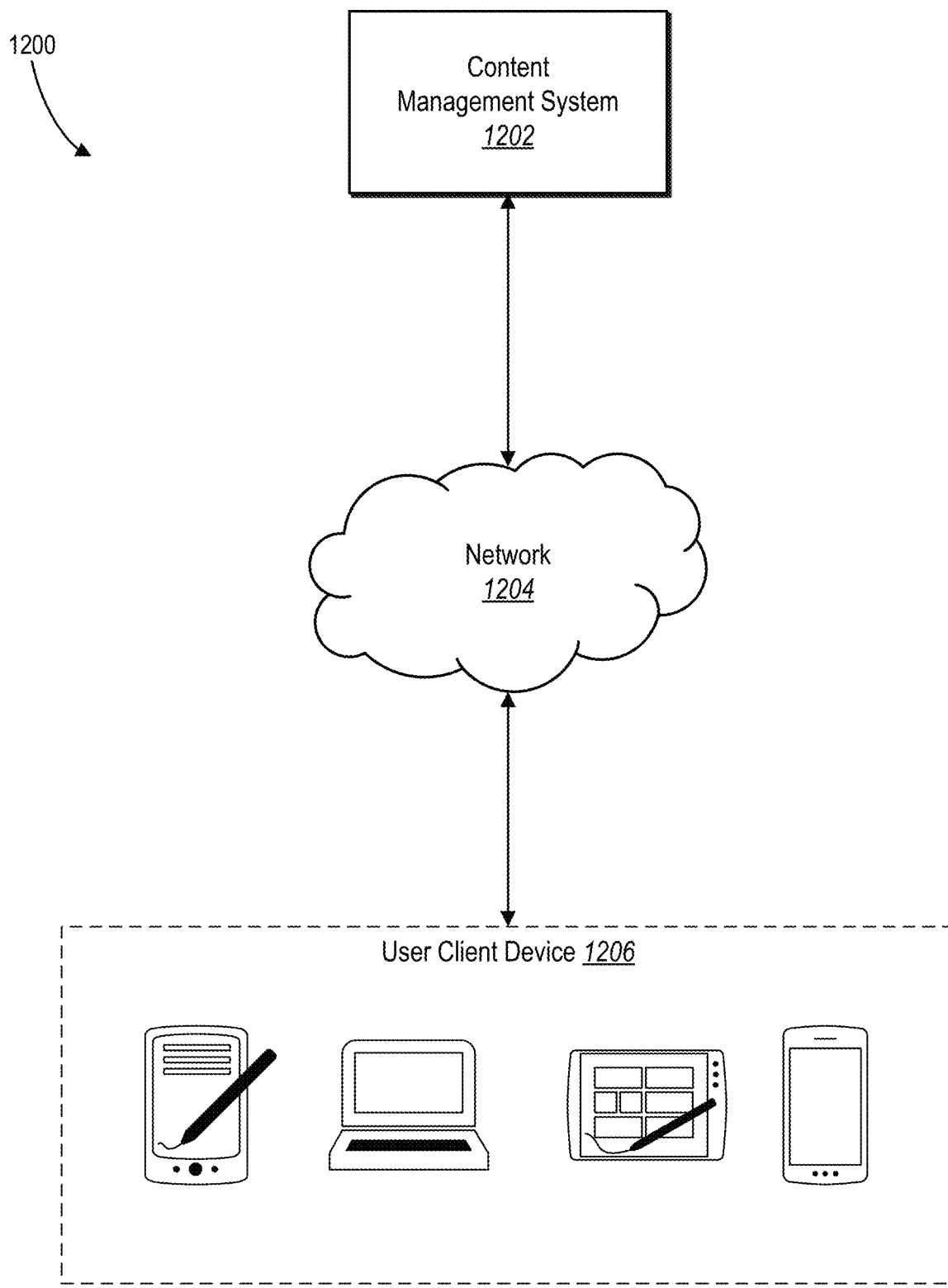
FIG. 12 illustrates an example environment of a networking system having the smart clipboard system in accordance with one or more embodiments.

FIG. 12 is a schematic diagram illustrating environment 1200 within which one or more implementations of the smart clipboard system 102 can be implemented. For example, the smart clipboard system 102 may be part of a content management system 1202 (e.g., the content management system 106). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    receiving, from a client device associated with a content management system, a first copy request to copy a first content item from a web-based folder;
    in response to the first copy request:
        providing, for display on the client device, a clipboard element representing a batch action clipboard for performing batch actions on content items copied to the batch action clipboard; and adding a first item reference corresponding to the first content item to the batch action clipboard;

receiving a second copy request from the client device to copy a second content item from an additional web-based folder;

in response to the second copy request:

adding a second item reference corresponding to the second content item to the batch action clipboard; and executing a batch action on the first content item and the second content item together based on a client device interaction in relation to the first item reference and the second item reference; and providing, within the clipboard element, one or more filtering options selectable to filter item references within the batch action clipboard according to content attributes.

2. The method of claim 1, wherein receiving the first copy request comprises receiving a client device interaction via a web browser interface associated with the content management system to copy the first content item from the web-based folder maintained by the content management system remotely from the client device.

3. The method of claim 1, further comprising:

providing, for display on the client device in relation to the clipboard element representing the batch action clipboard, an action menu including a set of selectable action elements for performing corresponding actions on one or more of the first content item or the second content item;

receiving a client device interaction from the client device selecting a selectable action element from the action menu for performing a batch action on the first content item and the second content item together; and executing the batch action on the first content item and the second content item in response to the client device interaction.

4. The method of claim 1, further comprising:

detecting an additional session within the content management system for a user account associated with the client device; and providing, for display on the client device in response to detecting the additional session, a visual representation of a clipboard history indicating the first item reference and the second item reference copied from a previous session of the user account within the content management system.

5. The method of claim 1, further comprising:

detecting, at a second client device, an additional session for a user account associated with the client device; and providing, for display on the second client device in response to detecting the additional session, a second clipboard element reflecting the first item reference and the second item reference copied via the client device.

6. The method of claim 1, further comprising:

receiving, from the client device, a client device interaction within the clipboard element to execute an action on the first content item; and demoting the first item reference within the clipboard element in response to the client device interaction to execute the action.

7. The method of claim 1, further comprising:

receiving, from the client device, a client device interaction to click and drag a third content item from the web-based folder to the clipboard element; and in response to the client device interaction to click and drag the third content item, adding a third item reference corresponding to the third content item to the clipboard element.

8. A system comprising:

at least one processor; and a non-transitory computer readable medium comprising instructions that, when executed by the at least one processor, cause the system to:

receive, from a client device associated with a content management system, a first copy request to copy a first content item from a first webpage of a web-based content management platform;

in response to the first copy request:

provide, for display on the client device, a clipboard element representing a batch action clipboard for performing batch actions on content items copied to the batch action clipboard; and add a first item reference corresponding to the first content item to the batch action clipboard;

receive a second copy request from the client device to copy a second content item from a second webpage of the web-based content management platform;

in response to the second copy request:

add a second item reference corresponding to the second content item to the batch action clipboard; and execute a batch action on the first content item and the second content item together based on a client device interaction in relation to the first item reference and the second item reference update the clipboard element for display on the client device to reflect the first item reference and the second item reference: and provide, within the clipboard element, one or more filtering options selectable to filter item references within the batch action clipboard according to content attributes.

9. The system of claim 8, further comprising instructions that, when executed by the at least one processor, cause the system to maintain, across multiple sessions within the content management system, a clipboard history comprising a chronological arrangement of item references representing copied content items.

10. The system of claim 8, further comprising instructions that, when executed by the at least one processor, cause the system to:

receive a client device interaction from the client device to expand the clipboard element; and in response to the client device interaction, provide a previous session indicator within an expanded version of the clipboard element indicating content items copied from a previous session within the content management system.

11. The system of claim 8, further comprising instructions that, when executed by the at least one processor, cause the system to:

receive a client device interaction selecting the first item reference and requesting to open first content item directly from the clipboard element; and in response to the client device interaction, open the first content item directly from the batch action clipboard.

12. The system of claim 8, further comprising instructions that, when executed by the at least one processor, cause the system to:

provide, within the clipboard element, a selectable option to view a set of batch actions for performing on multiple content items together; and execute, in response to a selection of a batch action from the set of batch actions, the batch action on the first content item and the second content item together.

13. The system of claim 8, further comprising instructions that, when executed by the at least one processor, cause the system to:

receive a client device interaction with the first item reference to perform an action on the first content item; and based on the client device interaction, automatically remove the first item reference corresponding to the first content item from the batch action clipboard upon performing the action on the first content item.

14. The system of claim 8, further comprising instructions that, when executed by the at least one processor, cause the system to provide, for display within the clipboard element, one or more tabs selectable to view item references corresponding to content items arranged according to content type.

15. A non-transitory computer readable medium comprising instructions that, when executed by at least one processor, cause a computing device to:

receive, from a client device associated with a content management system, a first copy request to copy a first content item from a web-based folder;

in response to the first copy request:
provide, for display on the client device, a clipboard element representing a batch action clipboard for performing batch actions on content items copied to the batch action clipboard; and add a first item reference corresponding to the first content item to the batch action clipboard;

receive a second copy request from the client device to copy a second content item from an additional web-based folder;

in response to the second copy request:
add a second item reference corresponding to the second content item to the batch action clipboard; and execute a batch action on the first content item and the second content item together based on a client device interaction in relation to the first item reference and the second item reference; and provide, within the clipboard element, one or more filtering options selectable to filter item references within the batch action clipboard according to content attributes.

16. The non-transitory computer readable medium of claim 15, further comprising instructions that, when executed by the at least one processor, cause the computing device to:

receive a client device interaction with the first item reference and the second item reference to paste the first content item and the second content item to a selected web-based folder;

and in response to the client device interaction to paste the first content item and the second content item:

retrieve the first content item from a first location within the web-based folder indicated by the first item reference;

retrieve the second content item from a second location within the additional web-based folder indicated by the second item reference; and copy the first content item from the first location within the web-based folder and the second content item from the second location within the additional web-based folder to the selected web-based folder.

17. The non-transitory computer readable medium of claim 15, further comprising instructions that, when executed by the at least one processor, cause the computing device to:

determine that the first item reference remains within the batch action clipboard for a threshold period of time without executing an action on the first content item; and in response to determining that the first item reference remains within the batch action clipboard for the threshold period of time, provide a notification to the client device requesting action on the first content item.

18. The non-transitory computer readable medium of claim 15, wherein the one or more filtering options comprise selectable options to apply batch actions to copied content items that satisfy selected filtering options.

19. The non-transitory computer readable medium of claim 15, further comprising instructions that, when executed by the at least one processor, cause the computing device to:

receive a client device interaction with the first item reference to perform an action on the first content item; and based on the client device interaction, disable the first item reference corresponding to the first content item within the batch action clipboard upon performing the action on the first content item.

20. The non-transitory computer readable medium of claim 15, further comprising instructions that, when executed by the at least one processor, cause the computing device to:

provide the batch action clipboard to a collaborative group of user accounts with access to the web-based folder and the additional web-based folder; and enable the collaborative group of user accounts to add and remove item references within the batch action clipboard from respective client devices.

* * * * *